United States Patent
Jang et al.

(10) Patent No.: US 12,022,205 B2
(45) Date of Patent: Jun. 25, 2024

(54) IMAGE DEVICE, IMAGE SENSOR, AND OPERATION METHOD OF IMAGE SENSOR

(71) Applicant: SAMSUNG ELECTRONICS CO., LTD., Suwon-si (KR)

(72) Inventors: Chanyoung Jang, Pohang-si (KR); Jongmin You, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 7 days.

(21) Appl. No.: 17/675,694

(22) Filed: Feb. 18, 2022

(65) Prior Publication Data
US 2022/0394219 A1  Dec. 8, 2022

(30) Foreign Application Priority Data

Jun. 8, 2021 (KR) .................. 10-2021-0073994

(51) Int. Cl.
*H04N 23/84* (2023.01)
*G06T 5/20* (2006.01)
(Continued)

(52) U.S. Cl.
CPC .............. *H04N 23/84* (2023.01); *G06T 5/20* (2013.01); *G06T 5/50* (2013.01); *G06T 7/90* (2017.01);
(Continued)

(58) Field of Classification Search
CPC .............................. H04N 23/84; H04N 25/133
(Continued)

(56) References Cited

U.S. PATENT DOCUMENTS 7,855,740 B2  12/2010  Hamilton, Jr. et al.
7,876,956 B2   1/2011  Adams, Jr. et al.
(Continued)

FOREIGN PATENT DOCUMENTS

CN  111741277 A   10/2020
EP  3 751 840 A1  12/2020
(Continued)

OTHER PUBLICATIONS

Eric Dubois et al., "Frequency-Domain Methods for Demosaicking of Bayer-Sampled Color Images", IEEE Signal Processing Letters, vol. 12, No. 12, Dec. 2005, 4 pages total.
(Continued)

*Primary Examiner* — Anthony J Daniels
(74) *Attorney, Agent, or Firm* — Sughrue Mion, PLLC

(57) ABSTRACT

An image sensor includes a pixel array including a plurality of pixels; a row driver configured to control the plurality of pixels; and an analog-to-digital converter configured to digitize a result sensed by the pixel array to generate a first image, wherein the pixel array includes: first pixel groups, wherein each first pixel group of the first pixel groups includes first white pixels and first color pixels among the plurality of pixels; and second pixel groups, wherein each second pixel group of the second pixel groups includes second white pixels and second color pixels among the plurality of pixels, and wherein first pixel data of the first image are generated based on the first white pixels and the first color pixels, and second pixel data of the first image are generated based on the second color pixels.

20 Claims, 19 Drawing Sheets

(51) Int. Cl.
*G06T 5/50* (2006.01)
*G06T 7/90* (2017.01)
*H04N 23/88* (2023.01)
*H04N 25/62* (2023.01)
*H04N 25/75* (2023.01)
*H04N 25/772* (2023.01)

(52) U.S. Cl.
CPC ............ *H04N 23/88* (2023.01); *H04N 25/62* (2023.01); *H04N 25/75* (2023.01); *H04N 25/772* (2023.01); *G06T 2207/10024* (2013.01); *G06T 2207/20224* (2013.01)

(58) Field of Classification Search
USPC .......................................................... 348/272
See application file for complete search history.

(56) References Cited

U.S. PATENT DOCUMENTS

| | | | |
|---|---|---|---|
| 7,889,921 | B2 | 2/2011 | Morales et al. |
| 8,139,130 | B2 | 3/2012 | Compton et al. |
| 8,330,839 | B2 | 12/2012 | Compton et al. |
| 8,452,082 | B2 | 5/2013 | Palum et al. |
| 2009/0295973 | A1 | 12/2009 | Oshikubo et al. |
| 2010/0141812 | A1* | 6/2010 | Hirota ............... H04N 9/646 348/279 |
| 2011/0134288 | A1* | 6/2011 | Kasai ............... H04N 25/625 348/241 |
| 2015/0146067 | A1 | 5/2015 | Roh et al. |
| 2016/0057367 | A1 | 2/2016 | Lee |
| 2020/0195872 | A1 | 6/2020 | Minagawa et al. |
| 2021/0029309 | A1 | 1/2021 | Maruyama et al. |
| 2021/0409659 | A1* | 12/2021 | Powell ............... H04N 25/134 |

FOREIGN PATENT DOCUMENTS

| | | | |
|---|---|---|---|
| KR | 10-1332689 B1 | 11/2013 | |
| KR | 10-1637671 B1 | 7/2016 | |
| KR | 10-1923957 B1 | 11/2018 | |
| WO | WO-2013145487 A1 * | 10/2013 | ........... G06T 3/4015 |

OTHER PUBLICATIONS

Kaiming He et al., "Guided Image Filtering", 2010, 14 pages total.

Chulhee Park et al., "G-Channel Restoration for RWB CFA with Double-Exposed WChannel", Sensors, 17, 293, doi: 10.3390/s17020293, Feb. 2017, 16 pages total.

* cited by examiner

IMAGE DEVICE, IMAGE SENSOR, AND OPERATION METHOD OF IMAGE SENSOR

CROSS-REFERENCE TO RELATED APPLICATIONS

This application is based on and claims priority under 35 U.S.C. § 119 to Korean Patent Application No. 10-2021-0073994 filed on Jun. 8, 2021, in the Korean Intellectual Property Office, the disclosures of which are incorporated by reference herein in its entirety.

BACKGROUND

1. Field

The disclosure relates to a semiconductor memory, and more particularly, to an image device, an image sensor, and an operation method of the image sensor.

2. Description of Related Art

An image sensor included in a smartphone, a tablet personal computer (PC), or a digital camera obtains image information about an external object by converting a light reflected from the external object into an electrical signal. Various image signal processing operations are performed to convert an electrical signal obtained from the image sensor into image information actually perceivable by a person or to improve the quality of image.

Nowadays, an image sensor having a multi-color filter array is widely adopted in various fields, and pixels that are formed to share a floating diffusion region are also widely adopted in various fields. In particular, as a white pixel is used, the sensitivity of sensing may be improved.

SUMMARY

Provided are an image device, an image sensor, and an operation method of the image sensor.

Additional aspects will be set forth in part in the description which follows and, in part, will be apparent from the description, or may be learned by practice of the presented embodiments.

In accordance with an aspect of the disclosure, an image sensor includes a pixel array including a plurality of pixels; a row driver configured to control the plurality of pixels; and an analog-to-digital converter configured to digitize a result sensed by the pixel array to generate a first image, wherein the pixel array includes: first pixel groups, wherein each first pixel group of the first pixel groups includes first white pixels and first color pixels among the plurality of pixels; and second pixel groups, wherein each second pixel group of the second pixel groups includes second white pixels and second color pixels among the plurality of pixels, and wherein first pixel data of the first image are generated based on the first white pixels and the first color pixels, and second pixel data of the first image are generated based on the second color pixels.

In accordance with an aspect of the disclosure, an operation method of an image sensor which includes a first pixel group and a second pixel group includes performing a first sum operation on the first pixel group including a first white pixel and a first color pixel in a first readout process, wherein, in the first sum operation, a first signal is sampled and output based on the first white pixel and the first color pixel; performing a second sum operation on the second pixel group including a second white pixel and a second color pixel in the first readout process, wherein, in the second sum operation, a second signal is sampled and output based on the second color pixel and not based on the second white pixel; converting the first signal and the second signal into a digital signal to generate a raw image; extracting a white image based on the raw image; performing a crosstalk compensation operation based on the white image to generate a crosstalk-compensated white image; and performing a subtraction operation on the raw image and the crosstalk-compensated white image to generate a Bayer image.

In accordance with an aspect of the disclosure, an image device includes an image sensor including a pixel set including a first pixel group, a second pixel group, a third pixel group, and a fourth pixel group; and an image signal processor configured to perform a signal processing operation on image data received from the image sensor, wherein the image sensor is configured to generate a raw image by: performing a first sum operation on each of the first pixel group, the second pixel group, and the third pixel group such that first pixel data are generated based on all pixels sharing floating diffusion regions; and performing a second sum operation on the fourth pixel group such that second pixel data are generated based on a part of pixels sharing a floating diffusion region; and wherein the first pixel group includes first white pixels and first green color pixels, wherein the second pixel group includes second white pixels and red color pixels, wherein the third pixel group includes third white pixels and blue color pixels, and wherein the fourth pixel group includes fourth white pixels and second green color pixels.

In accordance with an aspect of the disclosure, a method of obtaining an image, includes obtaining a raw image from a pixel array, wherein the pixel array includes a first pixel group including at least one first color pixel corresponding to a color, and at least one first white pixel, a second pixel group including at least one second color pixel corresponding to the color, and at least one second white pixel; obtaining, from the raw image, first pixel data based on the at least one first color pixel and the at least one first white pixel; obtaining, from the raw image, second pixel data based on the at least one second color pixel, wherein the second pixel data is not obtained based on the at least one second white pixel; obtaining a white image based on the first pixel data and the second pixel data; and obtaining a color image based on the first pixel data, the second pixel data, and the white image.

BRIEF DESCRIPTION OF THE FIGURES

The above and other aspects, features, and advantages of certain embodiments of the present disclosure will be more apparent from the following description taken in conjunction with the accompanying drawings, in which.

DETAILED DESCRIPTION

Below, embodiments of the present disclosure will be described in detail and clearly to such an extent that one skilled in the art easily carries out the present disclosure.

As is traditional in the field, embodiments may be described and illustrated in terms of blocks which carry out a described function or functions. These blocks, which may be referred to herein as units or modules or the like, or by names such as converter, processor, controller, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Figure 1:
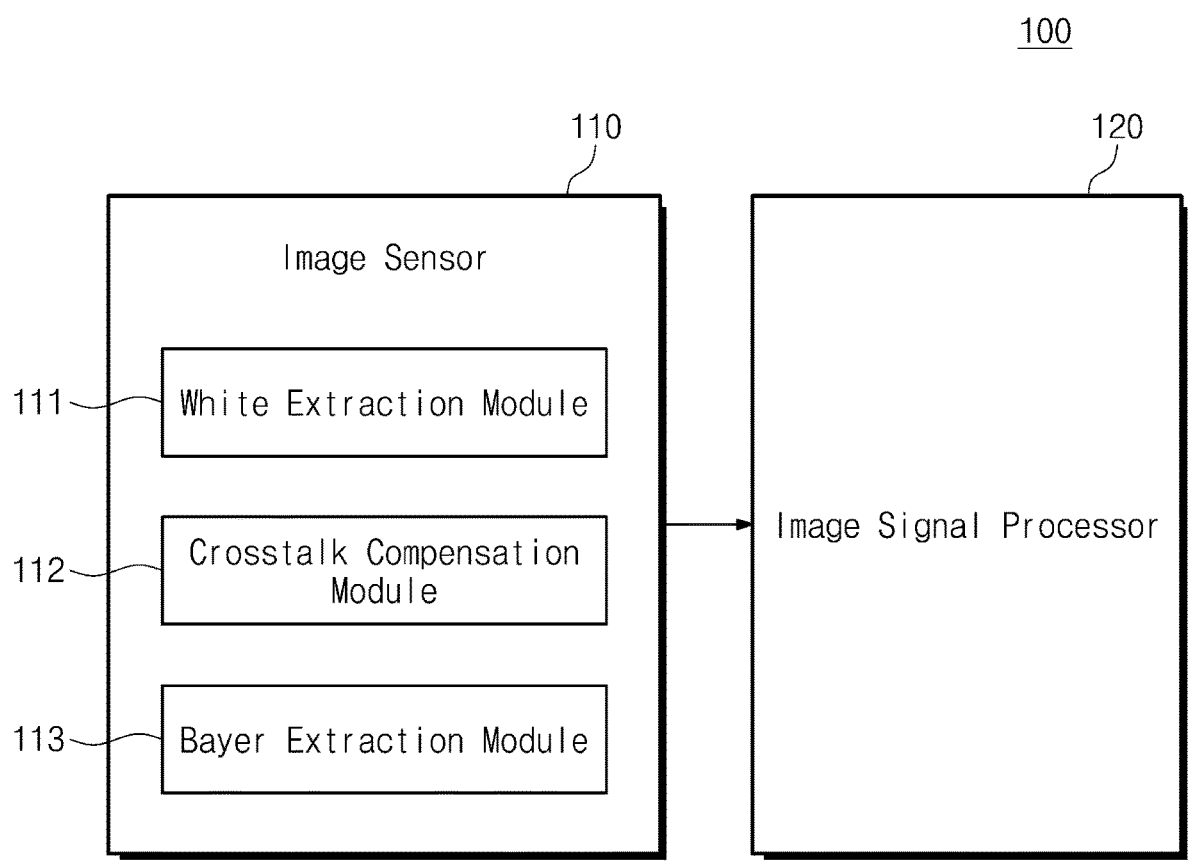
FIG. 1 is a block diagram illustrating an image device according to an embodiment.

FIG. 1 is a block diagram illustrating an image device according to an embodiment of the present disclosure. Referring to FIG. 1, an image device 100 may include an image sensor 110 and an image signal processor 120. The image device 100 may be included in various computing systems such as a desktop computer, a laptop computer, a tablet computer, a smartphone, a wearable device, a black box, and a digital camera.

The image sensor 110 may output image data based on a light incident from the outside, for example an outside of the image sensor 110, an outside of an image device 100, or an outside of a computing system or other device which includes the image sensor 110 or the image device 100. For example, the image sensor 110 may include a plurality of pixels. Each of the plurality of pixels may be configured to output an electrical signal corresponding to the light incident from the outside. The image sensor 110 may output image data based on the electrical signal. In an embodiment, the image data output from the image sensor 110 may include brightness information and color information of a particular frame.

For example, the image sensor 110 may be implemented with a complementary metal-oxide semiconductor (CMOS) image sensor or the like. For example, the image sensor 110 may be a multi-pixel image sensor having a dual pixel structure or a tetracell structure.

Four pixels among the plurality of pixels of the image sensor 110 may share one floating diffusion region. An example of this will be described in more detail with reference to FIG. 4. Below, for convenience of description, an operation of sampling and outputting a signal voltage level based on four pixels sharing one floating diffusion region is referred to as a "first sum operation" (e.g., FD 4 sum); an operation of sampling and outputting a signal voltage level based on two pixels sharing one floating diffusion region is referred to as a "second sum operation" (e.g., FD 2 sum); an operation of performing the first sum operation on a first part of the plurality of pixels and performing the second sum operation on a second part of the plurality of pixels is referred to as a "third sum operation" (e.g., FD 4 sum+FD 2 sum).

For convenience of description, below, a basic unit of a first-type array pattern may include four pixels, for example, a green color pixel "Gr", a red color pixel "R", a green color pixel "Gb", and a blue color pixel "B" sequentially arranged clockwise from an upper left end thereof. The first-type array pattern is referred to as a "Bayer pattern". A basic unit of a second-type array pattern may include one pixel, for example, a white pixel "W". The second-type array pattern is referred to as a "white pattern".

An image sensor to which a general RGBW pattern is applied may perform two readout operations. In a first readout operation, the image sensor may perform the second sum operation to generate an image of the Bayer pattern. Afterwards, in a second readout operation, the image sensor may perform the second sum operation to generate an image of the white pattern.

Figure 3:
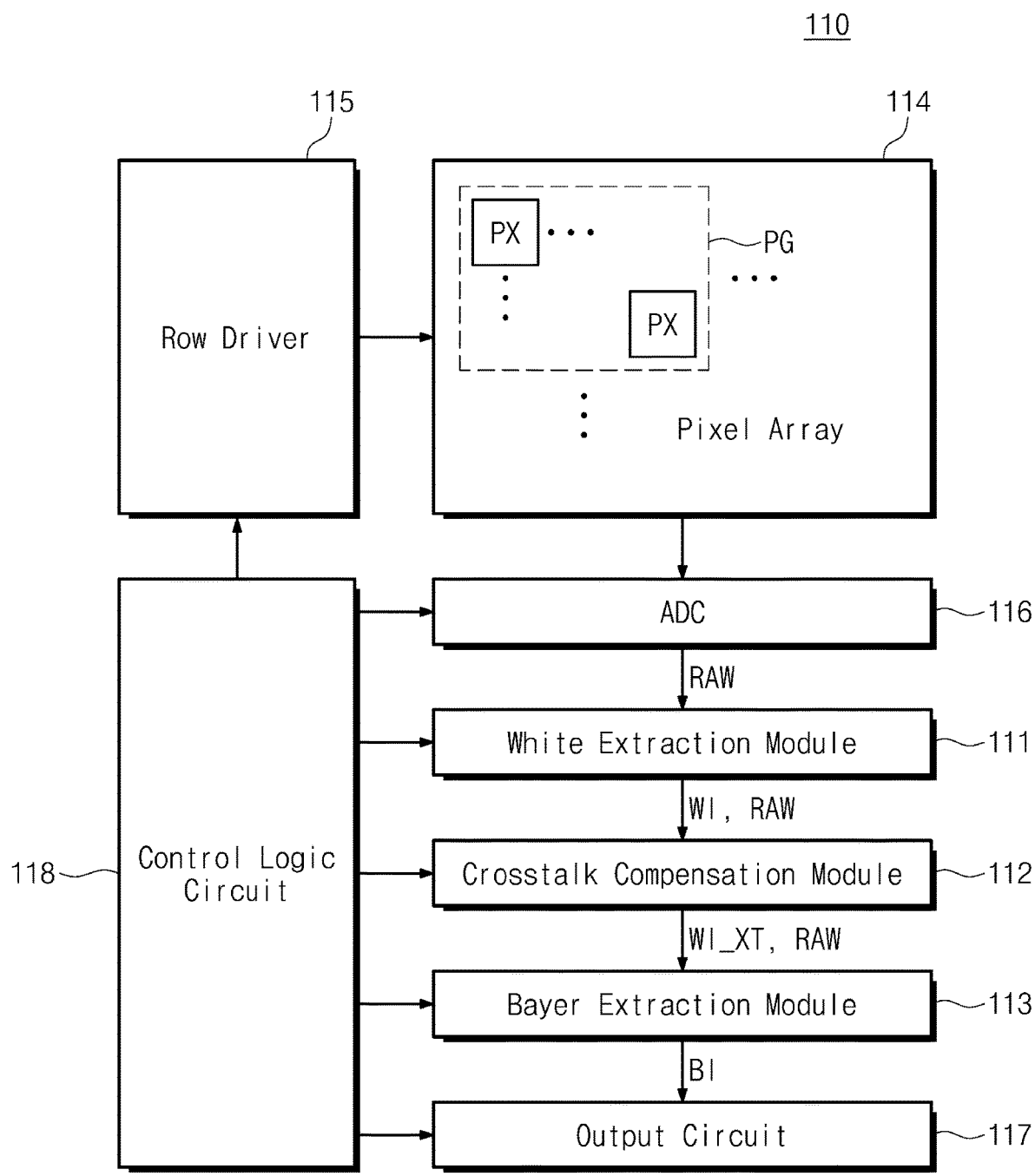
FIG. 3 is a block diagram illustrating an image sensor of FIG. 1, according to an embodiment.

In contrast, the image sensor 110 according to an embodiment of the present disclosure may perform one readout operation to generate a raw image RAW, as shown for example in FIG. 3. The image sensor 110 may perform the third sum operation to generate the raw image RAW of a non-Bayer pattern. The image sensor 110 may extract an image of the Bayer pattern (hereinafter referred to as a "Bayer image") from the raw image RAW. As such, the image sensor 110 may improve a frame rate and may reduce analog power consumption.

The image sensor 110 may include a white extraction module 111, a crosstalk compensation mode 112, and a Bayer extraction module 113. An example of a structure and an operation method of the white extraction module 111, the crosstalk compensation mode 112, and the Bayer extraction module 113 according to an embodiment of the present disclosure will be described in more detail with reference to drawings below.

The image signal processor 120 may receive image data from the image sensor 110 and may perform various signal processing operations on the received image data. In an embodiment, the image signal processor 120 may perform the following signal processing on the received image data:

noise cancellation, white balancing, gamma correction, color correction, and color transformation. The signal-processed image data may be transferred to an external device (e.g., a display device) or may be stored in a separate storage device.

Figure 2:
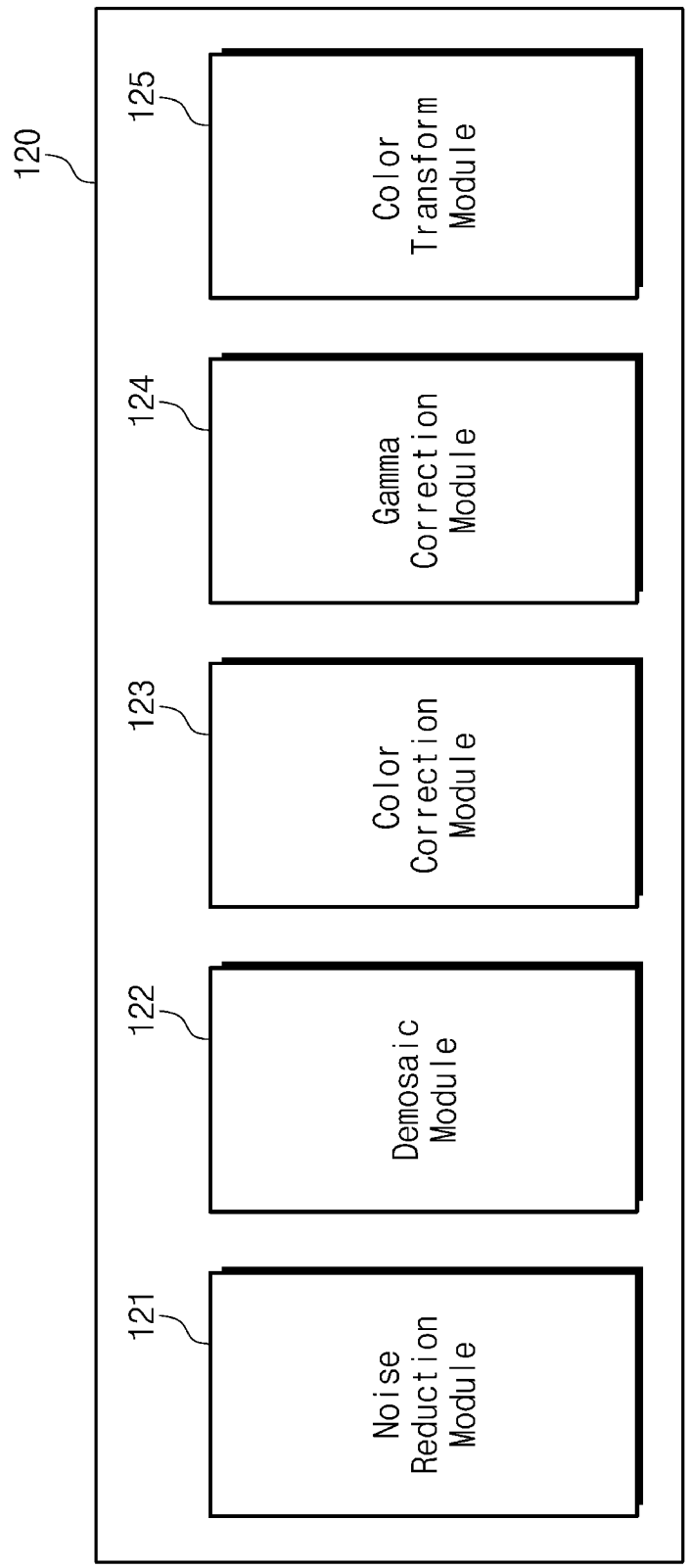
FIG. 2 is a block diagram illustrating an image signal processor of FIG. 1, according to an embodiment.

FIG. 2 is a block diagram illustrating an image signal processor of FIG. 1. Referring to FIGS. 1 and 2, the image signal processor 120 may include a noise reduction module 121, a demosaic module 122, a color correction module 123, a gamma correction module 124, and a color transform module 125.

The noise reduction module 121 may be configured to reduce a noise of the Bayer image received from the image sensor 110. For example, the noise reduction module 121 may be configured to reduce a fixed-pattern noise or a temporal random noise according to a color filter array (CFA) of the image sensor 110.

The demosaic module 122 may be configured to transform an output of the noise reduction module 121 to full-color data. For example, the output of the noise reduction module 121 may have a data format (e.g., a Bayer format or a tetra format) based on a CFA pattern of the image sensor 110. The demosaic module 122 may be configured to transform the data format according to the CFA pattern of the image sensor 110 to an RGB format.

The color correction module 123 may be configured to correct a color of a high-quality image transformed to the RGB format. The gamma correction module 124 may be configured to correct a gamma value of an output provided from the color correction module 123.

The color transform module 125 may be configured to transform an output of the gamma correction module 124 so as to correspond to a specific format. For example, the output of the gamma correction module 124 may have the RGB format. The color transform module 125 may transform the RGB format to a YUV format.

The image generated from the image signal processor 120 may be provided to an external display device or an external storage device. In an embodiment, the configuration of the image signal processor 120 illustrated in FIG. 2 is an example, and the present disclosure is not limited thereto. For example, the image signal processor 120 may further include additional components, which are configured to perform any other signal processing operation, as well as the above components.

FIG. 3 is a block diagram illustrating an image sensor of FIG. 1. Referring to FIGS. 1 and 3, the image sensor 110 may include the white extraction module 111, the crosstalk compensation mode 112, the Bayer extraction module 113, a pixel array 114, a row driver 115, an analog-to-digital converter 116, an output circuit 117, and a control logic circuit 118.

The pixel array 114 may include a plurality of pixels PX. Each of the plurality of pixels PX may be configured to output an electrical signal, the level of which is proportional to a magnitude of a light incident from the outside, based on the incident light, that is, an analog signal. In an embodiment, the plurality of pixels PX may be combined with different color filters (e.g., R, G, B, and W color filters) for the purpose of receiving lights of different wavelengths.

The plurality of pixels PX included in the pixel array 114 may be divided into a plurality of pixel groups PG. Each pixel group PG may include two or more pixels PX. Pixels included in one pixel group PG may share one floating diffusion region. However, the present disclosure is not limited thereto. For example, pixels included in one pixel group PG may share a plurality of floating diffusion regions.

In an embodiment, the pixel group PG may include 9 pixels PX arranged in 3 rows and 3 columns or may include 4 pixels PX arranged in 2 rows and 2 columns. However, the number of pixels including the pixel group PG is not limited thereto.

The pixel group PG may include color pixels for outputting information about a color and a white pixel. For example, the pixel group PG may include red (R) color pixels to convert a light of a red spectrum into an electrical signal, green (Gr/Gb) color pixels to convert a light of a green spectrum into an electrical signal, blue (B) color pixels to convert a light of a blue spectrum into an electrical signal, or white (W) color pixels to convert a light of a spectrum corresponding to the red (R), green (gr/Gb), and blue (B) color pixels into an electrical signal. To this end, a plurality of color filters may be formed on the pixel groups PG, and thus, a multi-color filter array (multi-CFA) may be implemented. The color filter array may be formed based on at least one of various patterns such as a Bayer pattern and a tetra pattern.

In an embodiment, a plurality of color filters may be formed on the pixel groups PG included in the pixel array 114 such that a multi-CFA is implemented thereon. A height at which a color filter is formed may vary depending on a process order. For example, a height of a color filter from a substrate may be relatively low if the color filter is formed relatively early. In contrast, a height of a color filter from the substrate may be relatively high if the color filter is formed relatively late. A color filter formed to be relatively low may be influenced by a color filter formed to be relatively high, thereby causing the crosstalk between pixels.

The row driver 115 may be configured to control the plurality of pixels PX included in the pixel array 114. For example, the row driver 115 may generate various control signals (e.g., a shutter signal, a transfer signal, a reset signal, and a select signal) for controlling the plurality of pixels PX. In an embodiment, the row driver 115 may control the plurality of pixels PX in units of a row, but the present disclosure is not limited thereto.

The ADC 116 may convert an analog signal formed from each pixel into a digital signal and may output the converted digital signal as data. In an embodiment, the ADC 116 may generate data based on correlated double sampling (CDS). Although not illustrated in FIG. 3, the image sensor 110 may further include a storage circuit or a memory configured to store data output from the ADC 116 or a ramp signal generator configured to generate a ramp signal to be used for an operation of the ADC 116. The ADC 116 may output the raw image RAW of the non-Bayer pattern to the white extraction module 111.

The white extraction module 111 may generate a white image WI based on the raw image RAW. For example, the white extraction module 111 may receive the raw image RAW from the ADC 116. The white extraction module 111 may perform a white extraction operation to generate the white image WI of a white pattern. The white extraction module 111 may output the white image WI and the raw image RAW to the crosstalk compensation mode 112. An example of the white extraction operation will be described in more detail with reference to FIG. 8.

The crosstalk compensation mode 112 may perform a crosstalk compensation operation based on the raw image RAW and the white image WI. For example, the crosstalk compensation mode 112 may receive the raw image RAW and the white image WI from the white extraction module 111. The crosstalk compensation mode 112 may perform the crosstalk compensation operation to generate a crosstalk-compensated white image WI_XT. The crosstalk compensation mode 112 may output the crosstalk-compensated white image WI_XT and the raw image RAW to the Bayer extraction module 113. An example of the crosstalk compensation operation will be described in more detail with reference to FIG. 7.

The Bayer extraction module 113 may generate a Bayer image BI based on the raw image RAW and the crosstalk-compensated white image WI_XT. For example, the Bayer extraction module 113 may receive the raw image RAW and the crosstalk-compensated white image WI_XT from the crosstalk compensation mode 112. For example, the Bayer extraction module 113 may perform a subtraction operation on the raw image RAW and the crosstalk-compensated white image WI_XT to extract the Bayer image BI. An example of this will be described in more detail with reference to FIG. 11C.

In an embodiment, each of the white extraction module 111 and the crosstalk compensation mode 112 may transfer the raw image RAW input thereto. However, the present disclosure is not limited thereto. Unlike the example illustrated in FIG. 3, the ADC 116 may directly output the raw image RAW to the crosstalk compensation mode 112 and the Bayer extraction module 113.

The output circuit 117 may transfer the Bayer image BI output from the Bayer extraction module 113 to an external device (e.g., a display or a storage device). The control logic circuit 118 may be configured to control various components in the image sensor 110 under control of an external control device (e.g., an image sensor controller or an application processor).

Figure 4A:
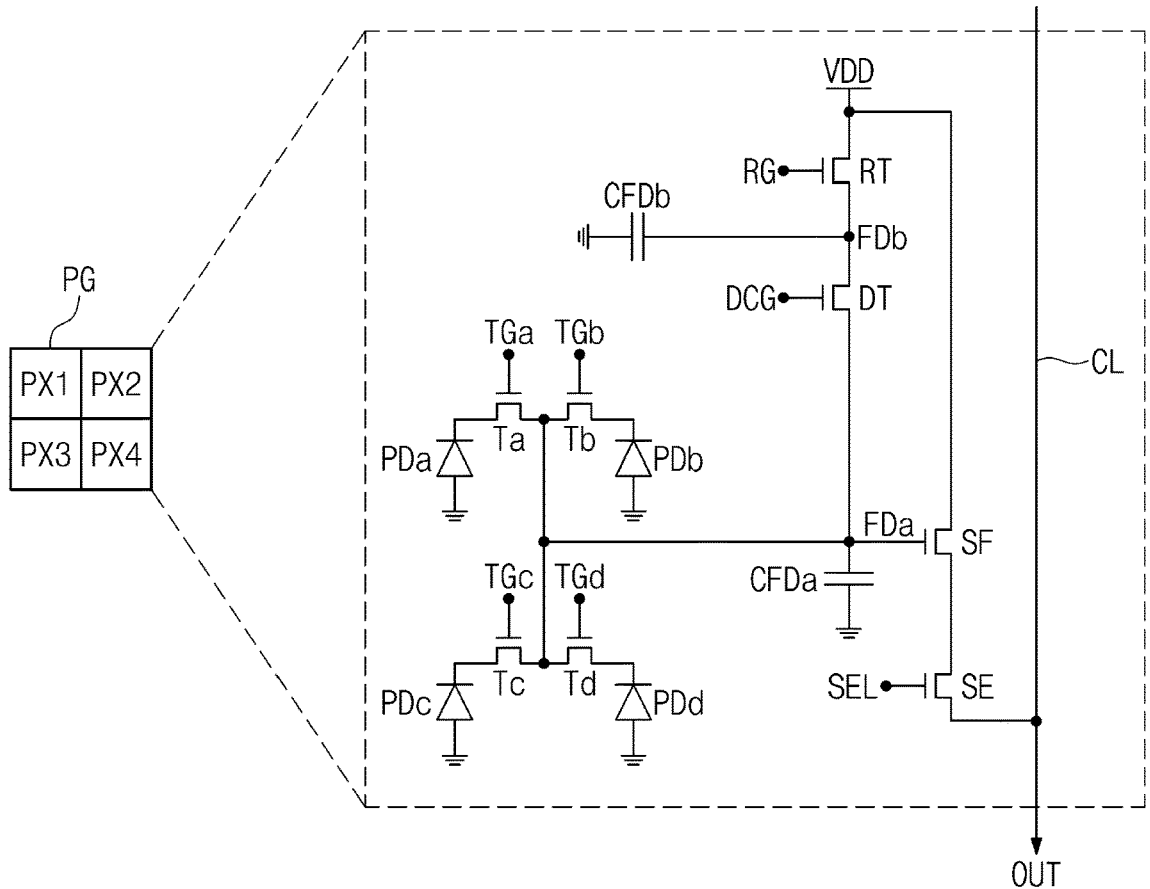
FIG. 4A illustrates a circuit diagram of a pixel group PG of FIG. 3, according to an embodiment.

FIG. 4A illustrates a circuit diagram of a pixel group PG of FIG. 3. For example, a pixel group PG of FIG. 4A may be included in the pixel array 114. In an embodiment, the pixel group PG may include first to fourth pixels PX1 to PX4.

The pixel group PG may include photoelectric conversion devices PDa to PDd, transfer transistors Ta to Td, a dual conversion transistor DT, a reset transistor RT, a source follower transistor SF, and a select transistor SE. The first pixel PX1 may include the first photoelectric conversion device PDa and the first transfer transistor Ta, the second pixel PX2 may include the second photoelectric conversion device PDb and the second transfer transistor Tb, the third pixel PX3 may include the third photoelectric conversion device PDc and the third transfer transistor Tc, and the fourth pixel PX4 may include the fourth photoelectric conversion device PDd and the fourth transfer transistor Td. The first to fourth pixels PX1 to PX4 may share the dual conversion transistor DT, the reset transistor RT, the source follower transistor SF, the select transistor SE, and first and second floating diffusion regions FDa and FDb.

The transfer transistors Ta to Td may transfer charges generated by the photoelectric conversion devices PDa to PDd to the first floating diffusion region FDa. For example, while the transfer transistor Ta is turned on by a transfer signal TGa received from the row driver 115, charges provided from the photoelectric conversion device PDa may be accumulated in the first floating diffusion region FDa. Operations of the remaining transfer transistors TGb to TGd may be similar to the operation of the transfer transistor TGa, and thus, charges provided from the photoelectric conversion devices PDb to PDd may be accumulated in the first floating diffusion region FDa. First ends of the transfer transistors Ta to Td may be respectively connected with the photoelectric conversion devices PDa to PDd, and second ends thereof may be connected in common with the first floating diffusion region FDa.

The first floating diffusion region FDa may accumulate charges converted by at least one of the photoelectric conversion devices PDa to PDd. In an embodiment, a capacitance of the first floating diffusion region FDa is depicted as a first capacitance CFDa. The first floating diffusion region FDa may be connected with a gate terminal of the source follower transistor SF that operates as a source follower amplifier. As a result, a voltage potential corresponding to the charges accumulated in the first floating diffusion region FDa may be formed.

The reset transistor RT may be turned on by a reset signal RG and may provide a reset voltage (e.g., a power supply voltage VDD) to the first floating diffusion region FDa. In this case, the charges accumulated in the first floating diffusion region FDa may move to a terminal for the power supply voltage VDD, and a voltage of the first floating diffusion region FDa may be reset.

The source follower transistor SF may amplify a change of an electrical potential of the first floating diffusion region FDa and may generate a voltage (i.e., an output signal OUT) corresponding to a result of the amplification. The select transistor SE may be driven by a selection signal SEL and may select pixels to be read in units of row. As the select transistor SE is turned on, the output signal OUT may be output through a column line CL.

Meanwhile, in a general environment, because the first floating diffusion region FDa is not easily saturated, there is no need to increase the capacitance (i.e., CFDA) of the first floating diffusion region FDa. However, in a high-illuminance environment, the first floating diffusion region FDa may be easily saturated. Accordingly, to prevent the saturation, the dual conversion transistor DT may be turned on, for example by dual conversion signal DCG, such that the first floating diffusion region FDa and the second floating diffusion region FDb are electrically connected. In this case, a capacitance of the floating diffusion regions FDa and FDb may be increased to a sum of the first capacitance CFDA and a second capacitance CFDb.

In an embodiment, in the case where an image processing device operates in a normal mode, the output signal OUT output from each of pixels included in the pixel group PG may be individually used. That is, the row driver 115 may independently control the transfer signals TGa to TGd such that the transfer transistors Ta to Td are individually turned on at different timings, and thus, the output signal OUT corresponding to charges converted by each photoelectric conversion device may be output through the column line CL at different timings.

In an embodiment, in the case where the image processing device operates in a binning mode, the charges converted by the pixels PX1 to PX4 included in the pixel group PG may be simultaneously used to generate one output signal OUT. For example, when the transfer transistors Ta to Td are turned on at the same time or at different timings, the charges converted by the pixels PX1 to PX4 may be accumulate in the first floating diffusion region FDa, and the output signal OUT corresponding to a sum of the charges converted by the photoelectric conversion devices PDa to PDd may be output through the column line CL.

Figure 4B:
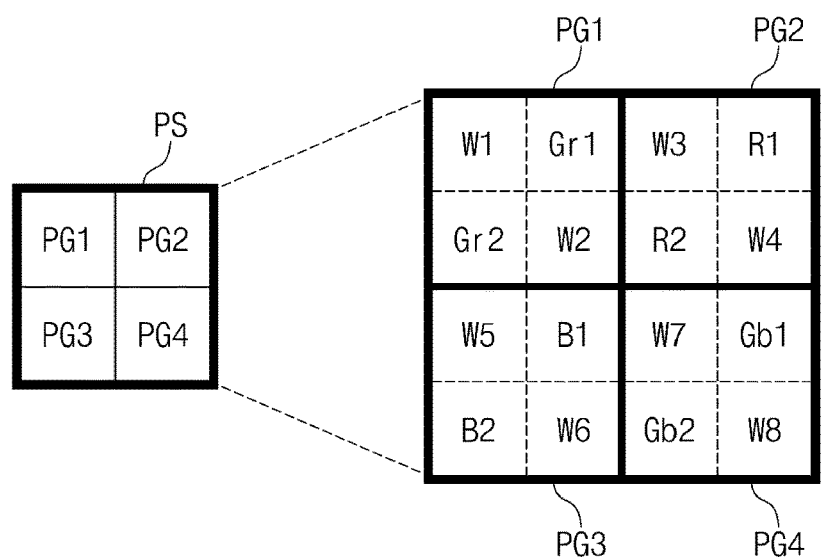
FIG. 4B is a diagram for describing a pixel set including pixel groups of FIG. 4A, according to an embodiment.

FIG. 4B is a diagram for describing a pixel set including pixel groups of FIG. 4A. Referring to FIGS. 3, 4A, and 4B, a pixel set PS may include first to fourth pixel groups PG1 to PG4. For example, the first pixel group PG1 may be at the first row and first column, the second pixel group PG2 may be at the first row and second column, the third pixel group PG3 may be at the second row and first column, and the fourth pixel group PG4 may be at the second row and first column. The pixel set PS may include 16 pixels arranged in 4 rows and 4 columns (i.e., 4×4). However, the present disclosure is not limited thereto. For example, the number of pixels included in the pixel set PS may increase or decrease. Each pixel may have a digital value or a pixel value (i.e., a code level) as an output of the image sensor 110.

The pixel set PS may have a non-Bayer pattern. For convenience of description, the pixel set PS may have a third-type array pattern. For example, in the third-type array pattern, a location at the first row and first column may be a white color location corresponding to white pixel W1; a location at the first row and second column may be a green color location corresponding to green pixel Gr1; a location at the first row and third column may be a white color location corresponding to white pixel W3; a location at the first row and fourth column may be a red color location corresponding to red pixel R1; a location at the second row and first column may be a green color location corresponding to green pixel Gr2; a location at the second row and second column may be a white color location corresponding to white pixel W2; a location at the second row and third column may be a red color location corresponding to red pixel R2; a location at the second row and fourth column may be a white color location corresponding to white pixel W4; a location at the third row and first column may be a white color location corresponding to white pixel W5; a location at the third row and second column may be a blue color location corresponding to blue pixel B1; a location at the third row and third column may be a white color location corresponding to white pixel W7; a location at the third row and fourth column may be a green color location corresponding to green pixel Gb1; a location at the fourth row and first column may be a blue color location corresponding to blue pixel B2; a location at the fourth row and second column may be a white color location corresponding to white pixel W6; a location at the fourth row and third column may be a green color location corresponding to green pixel Gb2; a location at the fourth row and fourth column may be a white color location corresponding to white pixel W8.

The pixel set PS may be divided into the plurality of pixel groups PG1 to PG4. The first pixel group PG1 may include green color pixels Gr1 and Gr2 and white pixels W1 and W2; the second pixel group PG2 may include red color pixels R1 and R2 and white pixels W3 and W4; the third pixel group PG3 may include blue color pixels B1 and B2 and white pixels W5 and W6; the fourth pixel group PG4 may include green color pixels Gb1 and Gb2 and white pixels W7 and W8.

Figure 4C:
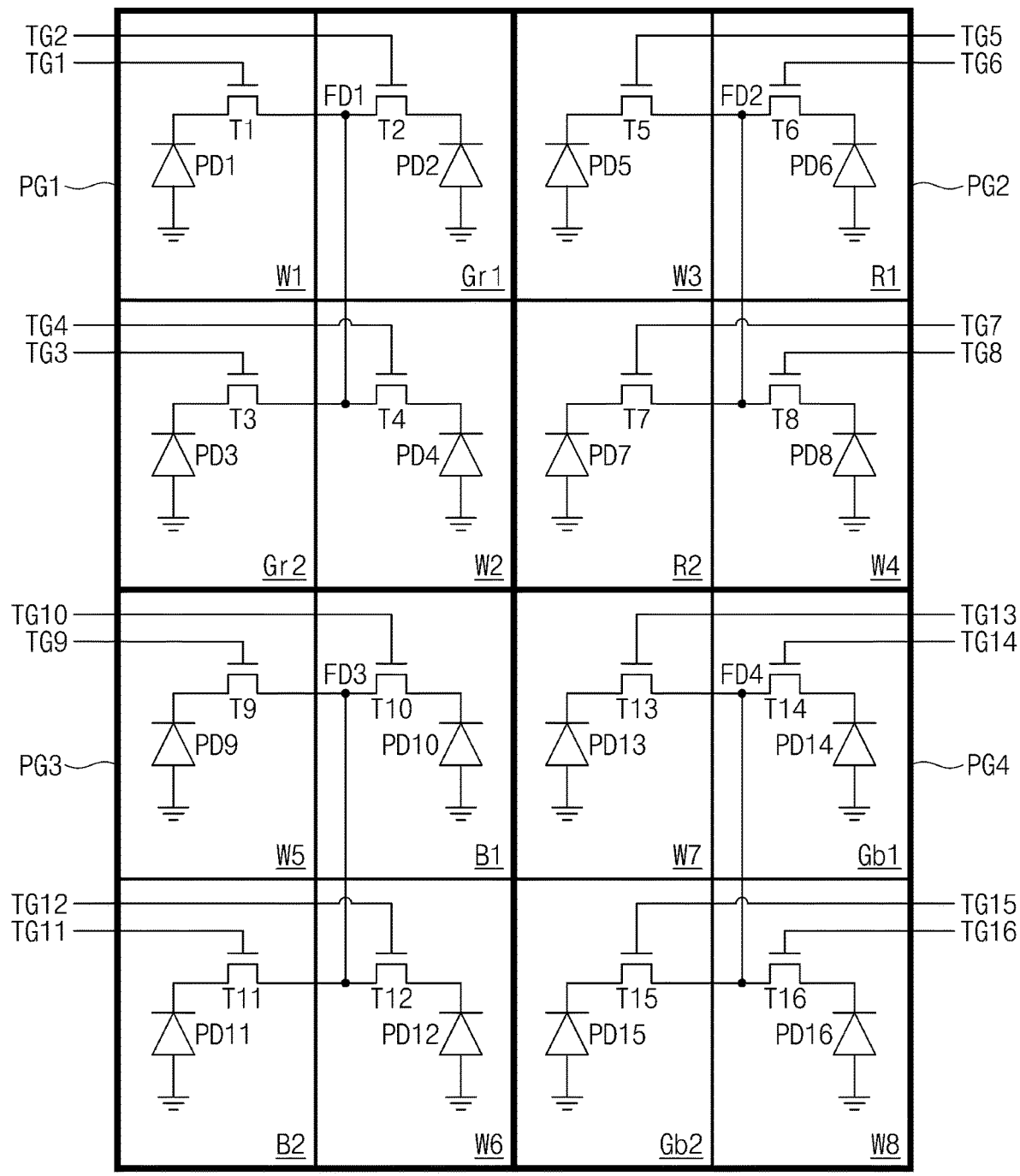
FIG. 4C is a diagram for describing a pixel set including pixel groups of FIG. 4A, according to an embodiment.

FIG. 4C is a diagram for describing a pixel set including pixel groups of FIG. 4A. Below, for brevity of drawing and for convenience of description, additional description associated with components the same as or similar to the above components will be omitted to avoid redundancy. Components that will be omitted below may be implemented through each of embodiments disclosed in the detailed description or through a combination thereof.

Referring to FIGS. 3, 4A, and 4C, the pixels W1, W2, Gr1, and Gr2 included in the first pixel group PG1 of the pixel set PS may share a first floating diffusion region FD1; the pixels W3, W4, R1, and R2 included in the second pixel group PG2 may share a second floating diffusion region FD2; the pixels W5, W6, B1, and B2 included in the third pixel group PG3 may share a third floating diffusion region FD3; the pixels W7, W8, Gb1, and Gb2 included in the fourth floating diffusion region FD4 may share a fourth floating diffusion region FD4.

In an embodiment, the first pixel group PG1 may include first to fourth transfer transistors T1 to T4 and first to fourth photoelectric conversion devices PD1 to PD4. For example, the first white pixel W1 may correspond to the first transfer transistor Ti and the first photoelectric conversion device PD1; the first green color pixel Gr1 may correspond to the second transfer transistor T2 and the second photoelectric conversion device PD2; the second green color pixel Gr2 may correspond to the third transfer transistor T3 and the third photoelectric conversion device PD3; the second white pixel W2 may correspond to the fourth transfer transistor T4 and the fourth photoelectric conversion device PD4.

The second pixel group PG2 may include fifth to eighth transfer transistors T5 to T8 and fifth to eighth photoelectric conversion devices PD5 to PD8. For example, the third white pixel W3 may correspond to the fifth transfer transistor T5 and the fifth photoelectric conversion device PD5; the first red color pixel R1 may correspond to the sixth transfer transistor T6 and the sixth photoelectric conversion device PD6; the second red color pixel R2 may correspond to the seventh transfer transistor T7 and the seventh photoelectric conversion device PD7; the fourth white pixel W4 may correspond to the eighth transfer transistor T8 and the eighth photoelectric conversion device PD8.

The third pixel group PG3 may include ninth to twelfth transfer transistors T9 to T12 and ninth to twelfth photoelectric conversion devices PD9 to PD12. For example, the fifth white pixel W5 may correspond to the ninth transfer transistor T9 and the ninth photoelectric conversion device PD9; the first blue color pixel B1 may correspond to the tenth transfer transistor T10 and the tenth photoelectric conversion device PD10; the second blue color pixel B2 may correspond to the eleventh transfer transistor T11 and the eleventh photoelectric conversion device PD11; the sixth white pixel W6 may correspond to the twelfth transfer transistor T12 and the twelfth photoelectric conversion device PD12.

The fourth pixel group PG4 may include thirteenth to sixteenth transfer transistors T13 to T16 and thirteenth to sixteenth photoelectric conversion devices PD13 to PD16. For example, the seventh white pixel W7 may correspond to the thirteenth transfer transistor T13 and the thirteenth photoelectric conversion device PD13; the first green color pixel Gb1 may correspond to the fourteenth transfer transistor T14 and the fourteenth photoelectric conversion device PD14; the second green color pixel Gb2 may correspond to the fifteenth transfer transistor T15 and the fifteenth photoelectric conversion device PD15; the eighth white pixel W8 may correspond to the sixteenth transfer transistor T16 and the sixteenth photoelectric conversion device PD16.

In an embodiment, a first transfer signal TG1 may be applied to a gate terminal of the first transfer signal TG1; a second transfer signal TG2 may be applied to a gate terminal of the second transfer signal TG2; a third transfer signal TG3 may be applied to a gate terminal of the third transfer signal TG3; a fourth transfer signal TG4 may be applied to a gate terminal of the fourth transfer signal TG4. The remaining transfer signals TG5 to TG16 are similar to the above description, and thus, additional description will be omitted to avoid redundancy.

Figure 5:
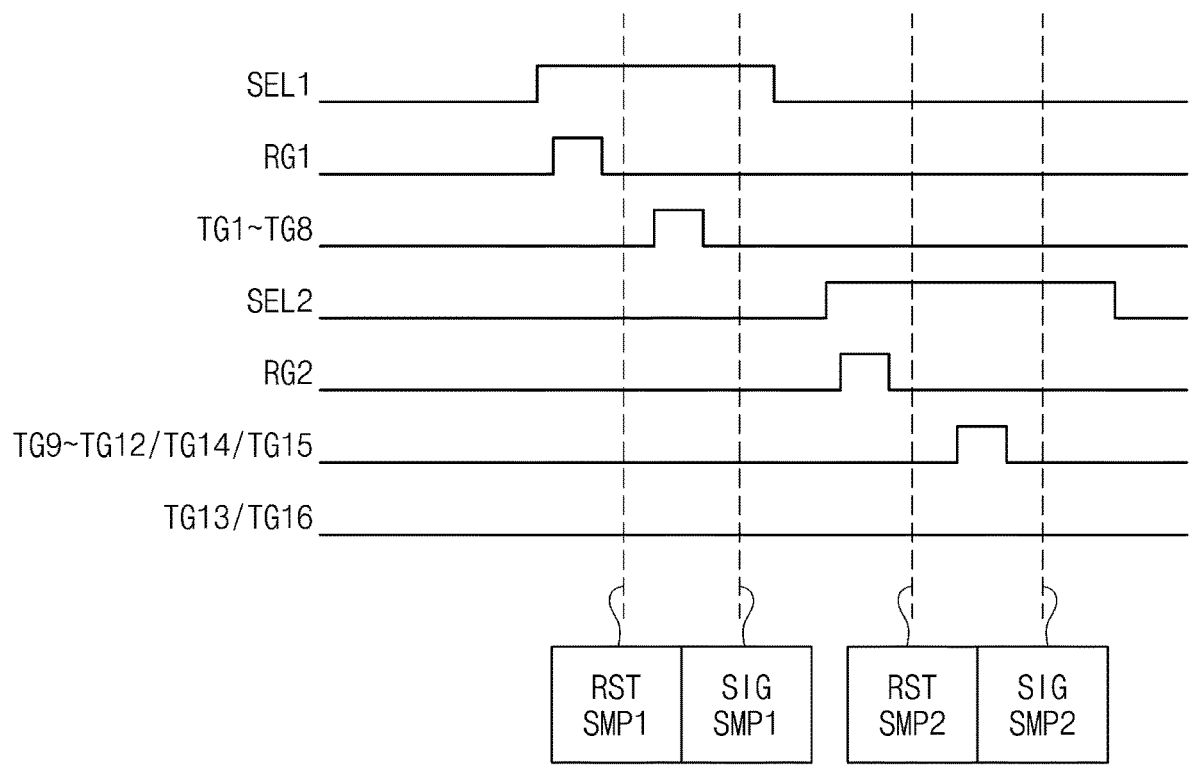
FIG. 5 is a timing diagram illustrating an example of waveforms of signals applied to a pixel set, according to an embodiment.

FIG. 5 is a timing diagram illustrating an example of waveforms of signals applied to a pixel set. Referring to FIGS. 4A, 4C, and 5, the image sensor 110 according to an embodiment of the present disclosure may perform the third sum operation to generate the raw image RAW. For example, the image sensor 110 may perform the first sum operation on the first, second, and third pixel groups PG1, PG2, and PG3 and may perform the second sum operation on the fourth pixel group PG4.

The first reset signal RG1 may be applied to the reset transistors of the first and second pixel groups PG1 and PG2, and the second reset signal RG2 may be applied to the reset transistors of the third and fourth pixel groups PG3 and PG4. The first selection signal SEL1 may be applied to the select transistors of the first and second pixel groups PG1 and PG2, and the second selection signal SEL2 may be applied to the select transistors of the third and fourth pixel groups PG3 and PG4.

During a first readout interval, the first selection signal SEL1 may be activated, the first reset signal RG1 may be activated and may then be deactivated, and at least one of the first to eighth transfer signals TG1 to TG8 may be activated and may then be deactivated. During the first readout interval, the second selection signal SEL2 may be deactivated, the second reset signal RG2 may be deactivated, and the ninth to sixteenth transfer signals TG9 to TG16 may be deactivated.

After the first selection signal SEL1 is activated and the first reset signal RG1 is activated and is then deactivated and before at least one of the first to eighth transfer signals TG1 to TG8 is activated, a readout circuit of the first pixel group PG1 may sample and output a reset voltage level of the first floating diffusion region FD1, and a readout circuit of the second pixel group PG2 may sample and output a reset voltage level of the second floating diffusion region FD2, for example as a signal RST SMP1. After at least one of the first to eighth transfer signals TG1 to TG8 is activated and is then deactivated, the readout circuit of the first pixel group PG1 may sample and output a signal voltage level of the first floating diffusion region FD1, and the readout circuit of the second pixel group PG2 may sample and output a signal voltage level of the second floating diffusion region FD2, for example as a signal SIG SMP1.

During a second readout interval, the second selection signal SEL2 may be activated, the second reset signal RG2 may be activated and may then be deactivated, and at least one of the ninth to twelfth, fourteenth, and fifteenth transfer signals TG9 to TG12, T14, and T15 may be activated and may then be deactivated. During the second readout interval, the first selection signal SEL1 may be deactivated, the first reset signal RG1 may be deactivated, the first to eighth transfer signals TG1 to TG8 may be deactivated, and the thirteenth and sixteenth transfer signals TG13 and TG16 may be deactivated.

After the second selection signal SEL2 is activated and the second reset signal RG2 is activated and is then deactivated and before at least one of the ninth to twelfth, fourteenth, and fifteenth transfer signals TG9 to TG12, T14, and T15 is activated, a readout circuit of the third pixel group PG3 may sample and output a reset voltage level of the third floating diffusion region FD3, and a readout circuit of the fourth pixel group PG4 may sample and output a reset voltage level of the fourth floating diffusion region FD4, for example as a signal RST SMP2. After at least one of the ninth to twelfth, fourteenth, and fifteenth transfer signals TG9 to TG12, T14, and T15 is activated and is then deactivated, the readout circuit of the third pixel group PG3 may sample and output a signal voltage level of the third floating diffusion region FD3, and the readout circuit of the fourth pixel group PG4 may sample and output a signal voltage level of the fourth floating diffusion region FD4, for example as a signal SIG SMP2.

In another embodiment, during the first readout interval, the first to eighth transfer signals TG1 to TG8 may be activated and may then be deactivated; during the second readout interval, the ninth to twelfth transfer signals TG9 to TG12 may be activated and may then be deactivated. As such, the first to third floating diffusion regions FD1 to FD3 may accumulate and store electrons integrated by all the corresponding photoelectric conversion devices. For example, the first floating diffusion region FD1 may accumulate and store electrons integrated by the first to fourth photoelectric conversion devices PD1 to PD4. A signal sampling value of the first pixel group PG1 may be generated based on the first and second white pixels W1 and W2 and the first and second green color pixels Gr1 and Gr2.

In another embodiment, during the second readout interval, the thirteenth and sixteenth transfer signals TG13 and TG16 may be continuously deactivated, and the fourteenth and fifteenth transfer signals TG14 and TG15 may be activated and may then be deactivated. As such, the fourth floating diffusion region FD4 may not accumulate and store electrons integrated by the thirteenth and sixteenth photoelectric conversion devices PD13 and PD16. That is, the fourth floating diffusion region FD4 may accumulate and store electrons integrated only by the fourteenth and fifteenth photoelectric conversion devices PD14 and PD15. A signal sampling value of the fourth pixel group PG4 may be generated based on only the first and second green color pixels Gb1 and Gb2, and not based on the seventh and eighth white pixels W7 and W8.

As described above, during a readout interval according to some embodiments, because the first to twelfth transfer signals TG1 to TG12 are activated and are then deactivated, each of the first to third pixel groups PG1 to PG3 may sample and output a signal voltage level based on four pixels included therein. In contrast, during a readout interval according to some embodiments, because the thirteenth and sixteenth transfer signals T13 and T16 are deactivated and the fourteenth and fifteenth transfer signals TG14 and TG15 are activated and are then deactivated, the fourth pixel group PG4 may sample and output a signal voltage level based on two pixels Gb1 and Gb2 included therein.

In the image sensor 110 according to an embodiment of the present disclosure, a first part of a plurality of pixels may perform the first sum operation, and a second part of the plurality of pixels may perform the second sum operation. That is, the image sensor 110 may perform the third sum operation. As such, the image sensor 110 according to an embodiment of the present disclosure may improve a frame rate and may reduce analog power consumption.

Figure 6:
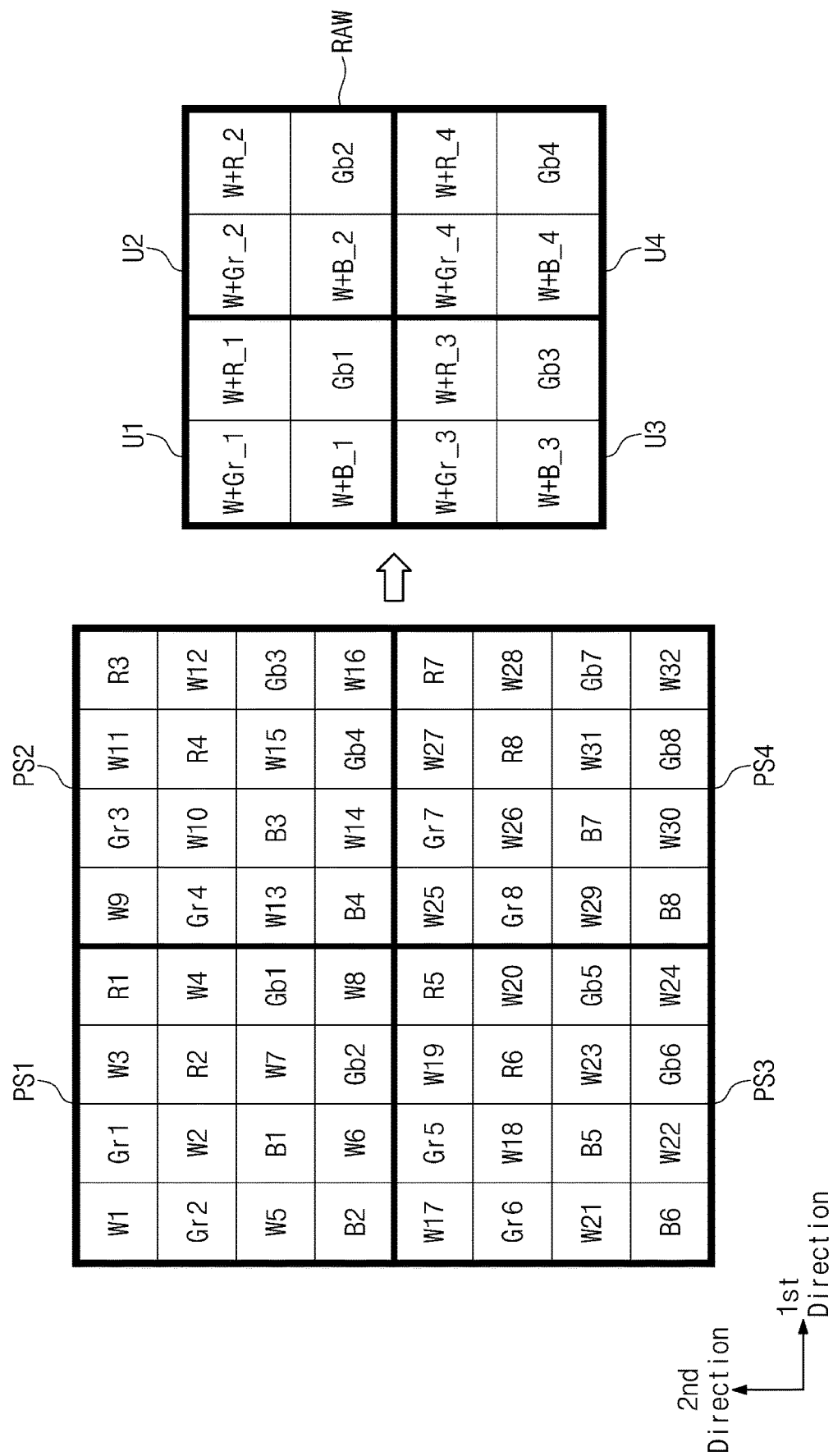
FIG. 6 is a diagram illustrating an example of a raw image output from an ADC of FIG. 3, according to an embodiment.

FIG. 6 is a diagram illustrating an example of a raw image output from an ADC of FIG. 3. Referring to FIGS. 3 and 6, the pixel array 114 may include first to fourth pixel sets PS1 to PS4. However, the present disclosure is not limited thereto. For example, the number of pixel sets included in the pixel array 114 may increase or decrease.

In an embodiment, the first pixel set PS1 may include first to eighth white pixels W1 to W8, first and second green color pixels Gr1 and Gr2, first and second red color pixels R1 and R2, first and second blue color pixels B1 and B2, and first and second green color pixels Gb1 and Gb2. The second pixel set PS2 may include ninth to sixteenth white pixels W9 to W16, third and fourth green color pixels Gr3 and Gr4, third and fourth red color pixels R3 and R4, third and fourth blue color pixels B3 and B4, and third and fourth green color pixels Gb3 and Gb4. The third pixel set PS3 may include seventeenth to twenty-fourth white pixels W17 to W24, fifth and sixth green color pixels Gr5 and Gr6, fifth and sixth red color pixels R5 and R6, fifth and sixth blue color pixels B5 and B6, and fifth and sixth green color pixels Gb5 and Gb6. The fourth pixel set PS4 may include twenty-fifth to thirty-second white pixels W25 to W32, seventh and eighth green color pixels Gr7 and Gr8, seventh and eighth red color pixels R7 and R8, seventh and eighth blue color pixels B7 and B8, and seventh and eighth green color pixels Gb7 and Gb8. Each of the first to fourth pixel sets PS1 to PS4 may have the third-type array pattern. For convenience, additional description associated with the pixel sets described above will be omitted to avoid redundancy.

The ADC 116 may output the raw image RAW. For example, the raw image RAW may include 16 pixels arranged in 4 rows and 4 columns (i.e., 4×4). However, the present disclosure is not limited thereto. For example, the number of pixels included in the raw image RAW may increase or decrease. Each pixel may have a digital value or a pixel value (i.e., a code level) as an output of the image sensor 110.

The raw image RAW may be divided into a plurality of basic units U1 to U4. Each of the plurality of basic units U1 to U4 may include 4 pixels arranged in 2 rows and 2 columns (i.e., 2×2), and pixel data may have a digital value. The raw image RAW may have a fourth-type array pattern. A basic unit of the fourth-type array pattern may include 4 pixels arranged in 2 rows and 2 columns (i.e., 2×2), for example, a white-green color pixel W+Gr, a white-red color pixel W+R, a green color pixel Gb1, and a white-blue color pixel W+B sequentially arranged clockwise from an upper left end thereof.

For example, in the first basic unit U1, the white-green color pixel W+Gr_1 may be at the first row and first column, the white-red color pixel W+R_1 may be at the first row and second column, the white-blue color pixel W+B_1 may be at the second row and first column, and the green color pixel Gb1 may be at the second row and first column. Color locations of the remaining basic units U2 to U4 may be determined to be similar to those of the first basic unit U1 described above. Thus, additional description will be omitted to avoid redundancy.

In an embodiment, the first pixel set PS1 may correspond to the first basic unit U1; the second pixel set PS2 may correspond to the second basic unit U2; the third pixel set PS3 may correspond to the third basic unit U3; the fourth pixel set PS4 may correspond to the fourth basic unit U4.

In the first basic unit U1, the white-green color pixel W+Gr_1 may correspond to the first pixel group PG1 of the first pixel set PS1; the white-red color pixel W+R_1 may correspond to the second pixel group PG2 of the first pixel set PS1; the white-blue color pixel W+B_1 may correspond to the third pixel group PG3 of the first pixel set PS1; the green color pixel Gb1 may correspond to the fourth pixel group PG4 of the first pixel set PS1.

In detail, a digital value of a white-green color pixel W+Gr_1 may be determined based on the first and second white pixels W1 and W2 and the first and second green color pixels Gr1 and Gr2. A digital value of a white-red color pixel W+R_1 may be determined based on the third and fourth white pixels W3 and W4 and the first and second red color pixels R1 and R2. A digital value of a white-blue color pixel W+B_1 may be determined based on the fifth and sixth white pixels W5 and W6 and the first and second blue color pixels B1 and B2. A digital value of a green color pixel Gb1 may be determined based on the first and second green color pixels Gb1 and Gb2. Digital values of the remaining pixels of the raw image RAW are determined to be similar to those described above, and thus, additional description will be omitted to avoid redundancy.

Figure 7:
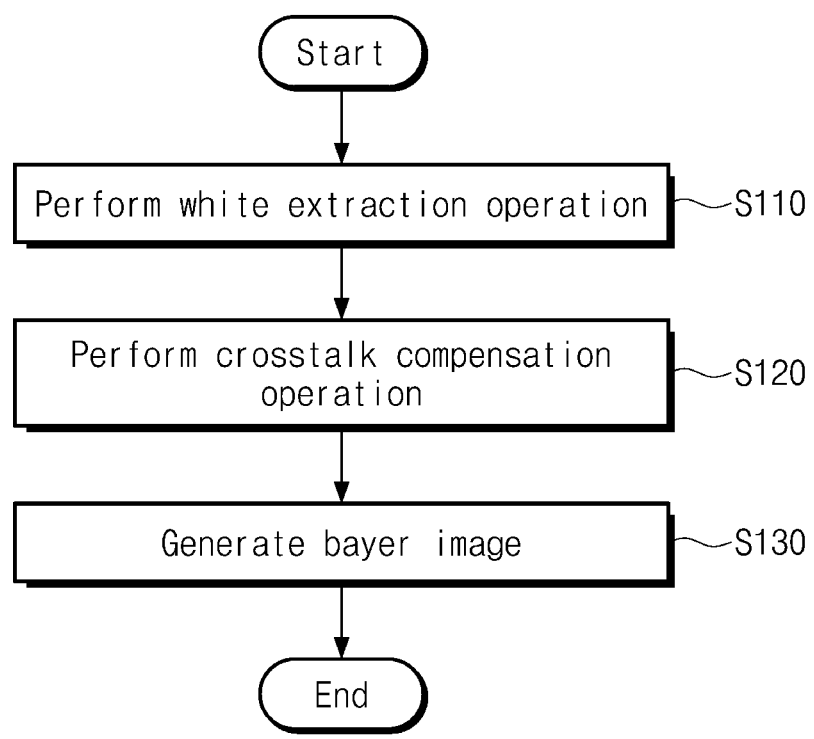
FIG. 7 is a flowchart illustrating an operation of an image sensor of FIG. 1, according to an embodiment.

FIG. 7 is a flowchart illustrating an operation of an image sensor of FIG. 1. Referring to FIGS. 1, 3, and 7, the image sensor 110 may generate an image of the Bayer pattern based on an image of the non-Bayer pattern. That is, the image sensor 110 may convert the image of the non-Bayer pattern into the image of the Bayer pattern.

In operation S110, the image sensor 110 may perform the white extraction operation based on the raw image RAW. For example, the white extraction module 111 may receive the raw image RAW from the ADC 116. The white extraction module 111 may generate the white image WI based on the raw image RAW. An example of the white extraction operation will be described in more detail with reference to FIG. 8.

In operation S120, the image sensor 110 may perform the crosstalk compensation operation based on the white image WI. For example, the crosstalk compensation mode 112 may receive the raw image RAW and the white image WI from the white extraction module 111. The crosstalk compensation mode 112 may perform the crosstalk compensation operation on the white image WI based on calibration data and thus may generate the crosstalk-compensated white image WI_XT. The crosstalk compensation mode 112 may output the crosstalk-compensated white image WI_XT and the raw image RAW to the Bayer extraction module 113.

A crosstalk may indicate a signal that is generated by the interferences between pixels. The crosstalk may include an optical crosstalk caused by a micro lens and an electrical crosstalk caused by electromagnetic interference at silicon. For example, the crosstalk compensation mode 112 may provide compensation for a crosstalk according to a height difference between color filters of pixels included in the pixel array 114.

In an embodiment, the optical crosstalk may be influenced by peripheral pixels. In particular, the crosstalk may have a great influence of pixels horizontally or vertically adjacent to a pixel. For example, referring to FIG. 6, pixels adjacent to the green color pixels "Gr" (i.e., Gr1 to Gr8), the red color pixels "R" (i.e., R1 to R8), the blue color pixels "B" (i.e., B1 to B8), and the green color pixels "Gb" (i.e., Gb1 to Gb8) in the first direction and the second direction are white pixels. As such, the green, red, blue, and green color pixels Gr, R, B, and Gb may have a crosstalk influence based on only the white pixels "W".

In contrast, colors of pixels adjacent to the white pixels "W" (i.e., W1 to W32) in the first direction and the second direction are different depending on locations of the white pixels "W". As such, a crosstalk associated with each white pixel "W" may change depending on pixels adjacent thereto in the first direction and the second direction.

In an embodiment, the image sensor 110 may generate and store calibration data, which may be used to perform the crosstalk compensation operation, based on pixels adjacent to each of the white pixels "W" in the first direction and the second direction. For example, the calibration data may be values measured in advance and may be stored in an external memory in a compressed form.

The crosstalk compensation mode 112 may load the calibration data from the external memory and may perform the crosstalk compensation operation on the white image WI based on the calibration data. For example, the crosstalk compensation mode 112 may generate the crosstalk-compensated white image WI_XT by multiplying a code level of the white image WI and a corresponding calibration value of the calibration data together.

In operation S130, the image sensor 110 may generate the Bayer image BI based on the white image WI and the raw image RAW. For example, the Bayer extraction module 113 may receive the crosstalk-compensated white image WI_XT and the raw image RAW from the crosstalk compensation mode 112.

In an embodiment, the Bayer extraction module 113 may generate the Bayer image BI by performing a subtraction operation on the raw image RAW and the crosstalk-compensated white image WI_XT. In an embodiment, the Bayer extraction module 113 may generate the Bayer image BI by subtracting the crosstalk-compensated white image WI_XT from the raw image RAW.

As described above, the image sensor 110 according to an embodiment of the present disclosure may generate the raw image RAW through a single readout operation and may convert the raw image RAW into the Bayer image BI.

Figure 8:
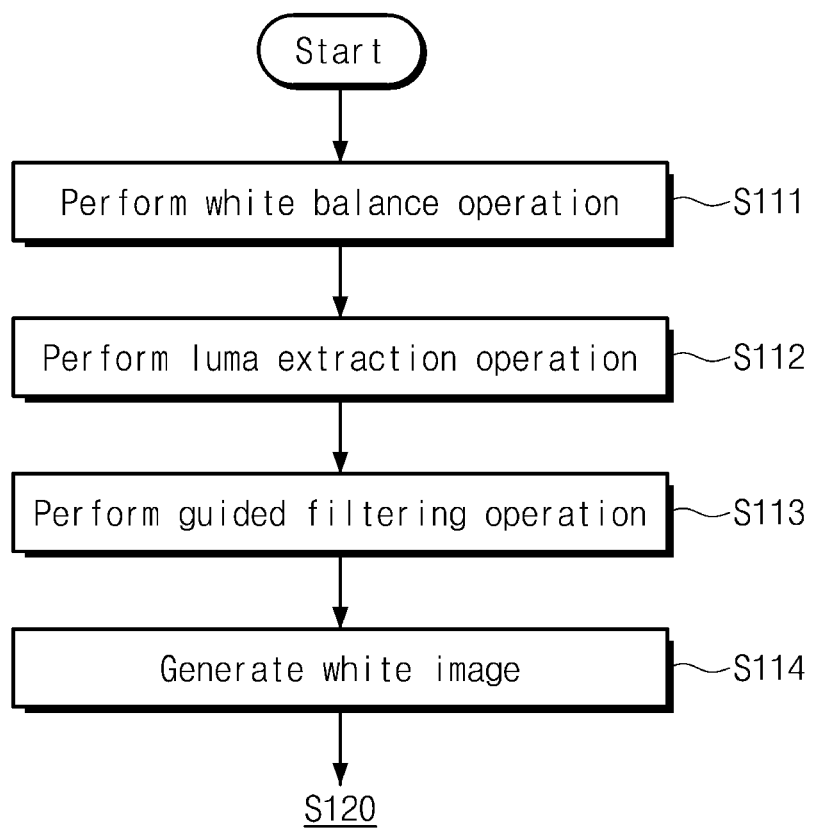
FIG. 8 is a flowchart illustrating operation S110 of FIG. 7 in more detail, according to an embodiment.
Figure 9:
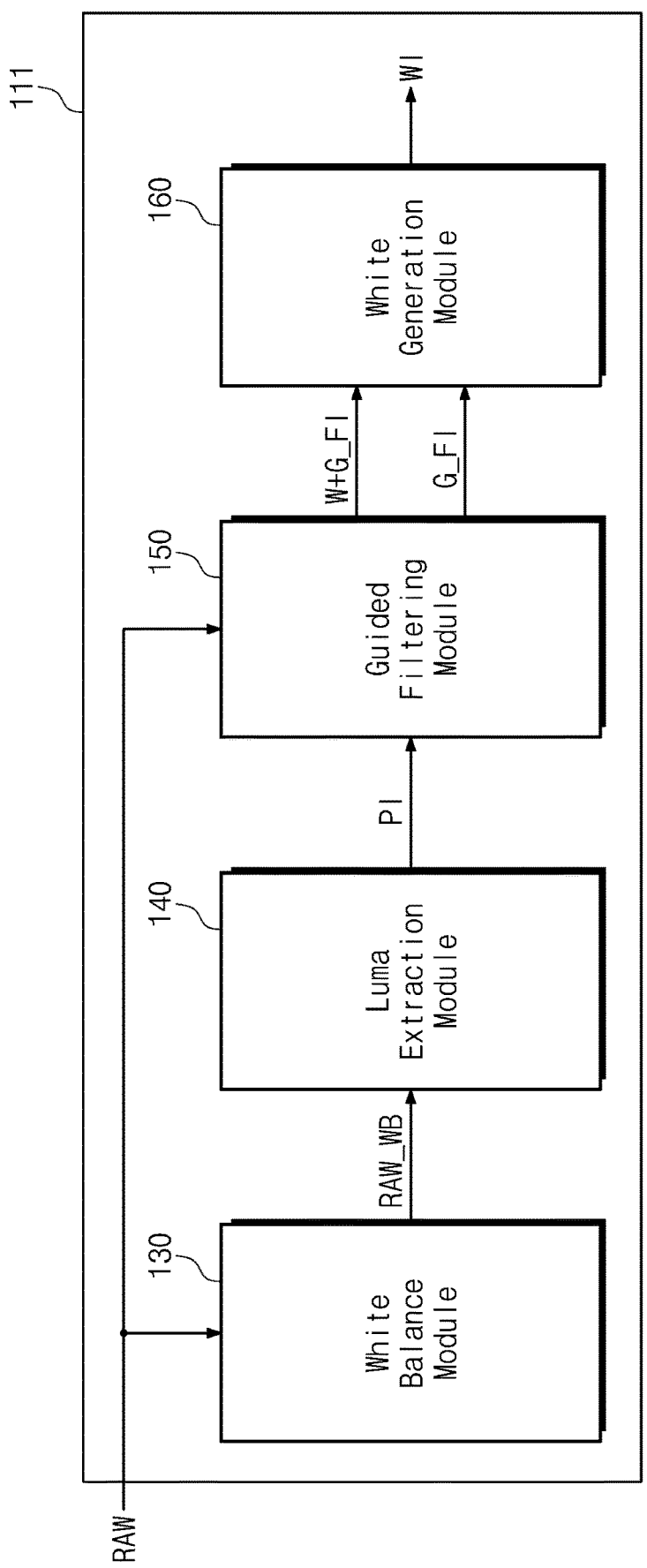
FIG. 9 is a block diagram illustrating a white extraction module of FIG. 3 in more detail, according to an embodiment.

FIG. 8 is a flowchart illustrating an example of operation S110 of FIG. 7 in more detail. FIG. 9 is a block diagram illustrating an example of a white extraction module of FIG. 3 in more detail. Referring to FIGS. 3, 7, 8, and 9, the image sensor 110 may perform the white extraction operation based on the raw image RAW. In an embodiment, the white extraction module 111 may include a white balance module 130, a luma extraction module 140, a guided filtering module 150, and a white generation module 160. The configuration and the operation method of the white extraction module 111 illustrated in FIGS. 8 and 9 are an example, and thus, the present disclosure is not limited thereto.

A color may be expressed by hue, chroma, and value. The chroma of an achromatic target may be "0". G, R, and B values of the hue of the achromatic target may be equal. The achromatic target may have various values.

In operation S111, the image sensor 110 may perform a white balance operation. For example, the white balance module 130 may receive the raw image RAW from the ADC 116. The white balance module 130 may perform the white balance operation to generate a white balance raw image RAW_WB. The white balance module 130 may output the white balance raw image RAW_WB to the luma extraction module 140.

The white balance operation may adjust gains of G, R, and B hues of lights captured by the image sensor 110 after reflected from a target. The white balance module 130 may adjust a white balance gain for the raw image RAW and may perform the white balance operation based on the adjusted white balance gain.

In operation S112, the image sensor 110 may perform a luma extraction operation. For example, the luma extraction module 140 may receive the white balance raw image RAW_WB. The luma extraction module 140 may perform the luma extraction operation to generate a panchromatic image PI. For example, the luma extraction module 140 may perform the luma extraction operation based on the white balance raw image RAW_WB and thus may generate the panchromatic image PI (e.g., an achromatic image) in which the chroma is "0" and the G, R, a B values are equal. The luma extraction module 140 may output the panchromatic image PI to the guided filtering module 150.

In operation S113, the image sensor 110 may perform a guided filtering operation. For example, the guided filtering module 150 may receive the raw image RAW and the panchromatic image PI. The guided filtering module 150 may perform the guided filtering operation based on the raw image RAW and the panchromatic image PI and thus may generate a white-green full image W+G_FI and a green full image G_FI. The guided filtering module 150 may output the white-green full image W+G_FI and the green full image G_FI to the white generation module 160.

In an embodiment, the white-green full image W+G_FI may have a fifth-type array pattern. A basic unit of the fifth-type array pattern may include one pixel, for example, a white-green color pixel W+G. The green full image G_FI may have a sixth-type array pattern. A basic unit of the sixth-type array pattern may include one pixel, for example, a green color pixel "G".

In operation S114, the image sensor 110 may perform a white generation operation. For example, the white generation module 160 may receive the white-green full image W+G_FI and the green full image G_FI. The image sensor 110 may generate the white image WI by performing a subtraction operation on the white-green full image W+G_FI and the green full image G_FI.

Figure 10:
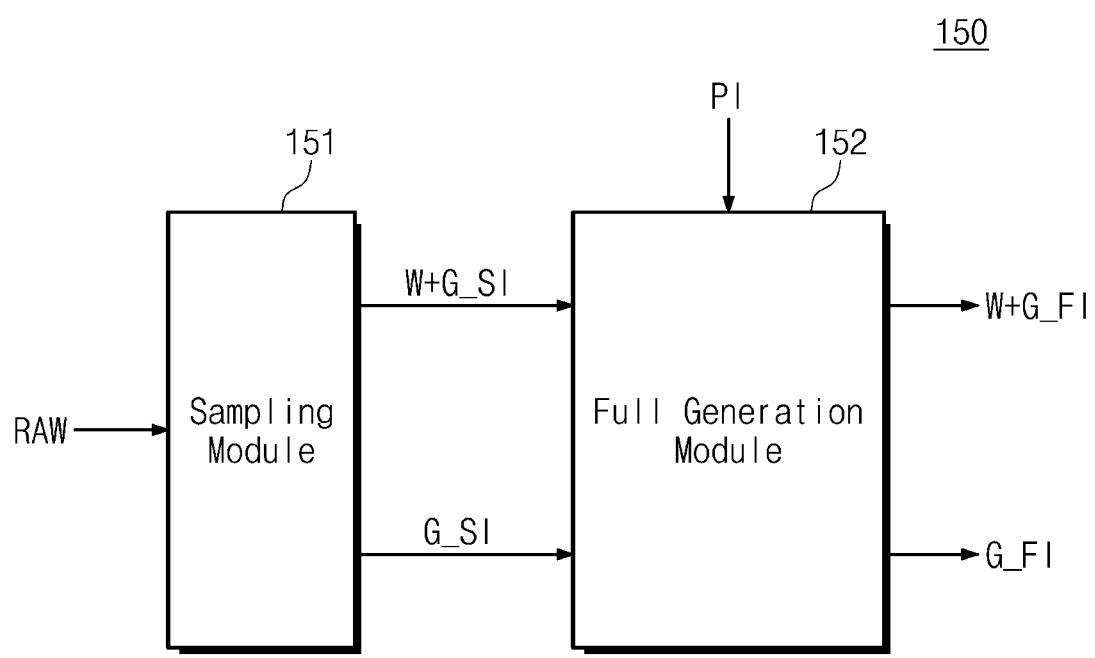
FIG. 10 is a block diagram illustrating a guided filtering module of FIG. 9 in more detail, according to an embodiment.
Figure 11A:
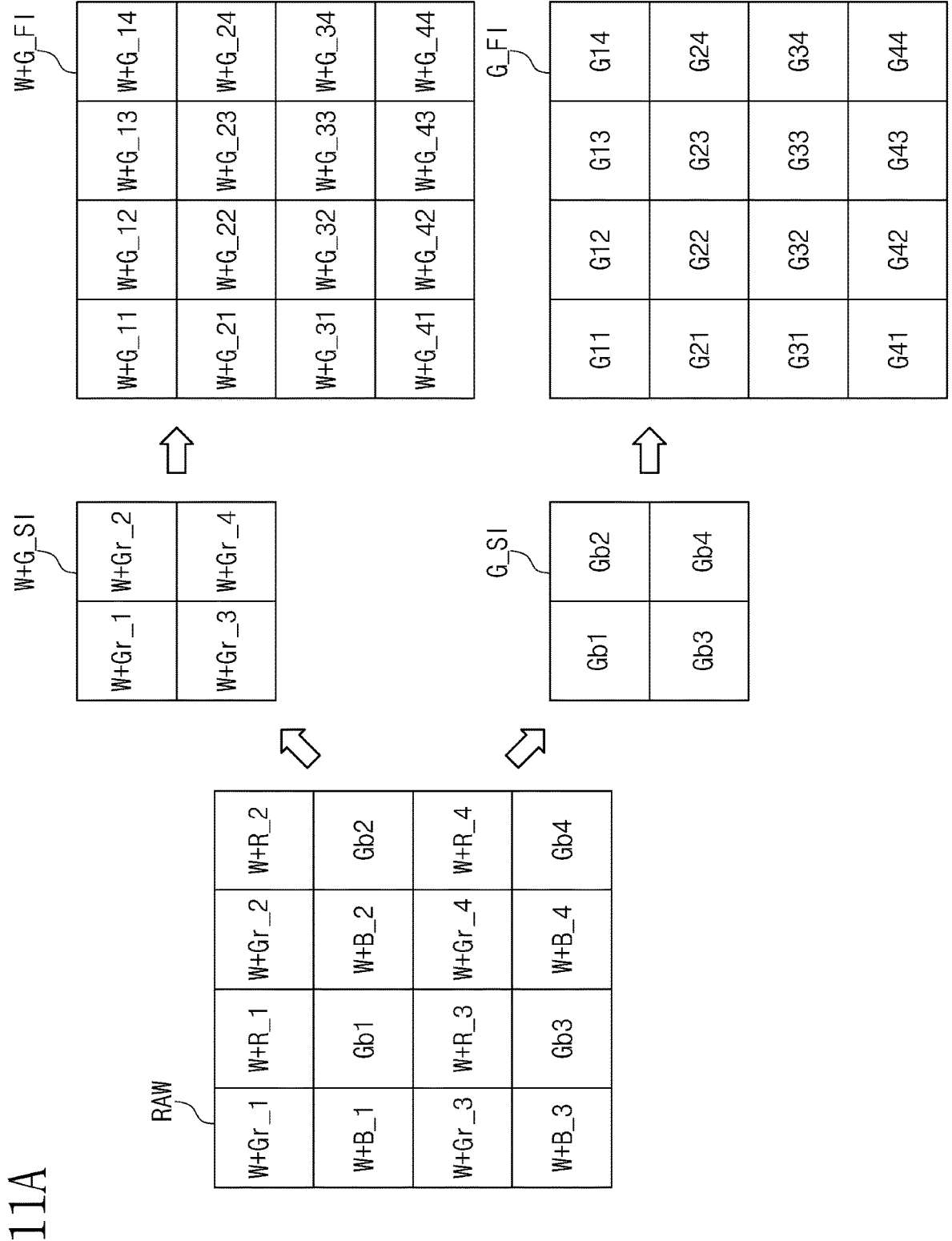
FIGS. 11A to 11C are diagrams for describing a method of converting a raw image into a Bayer image, according to an embodiment.
Figure 11B:
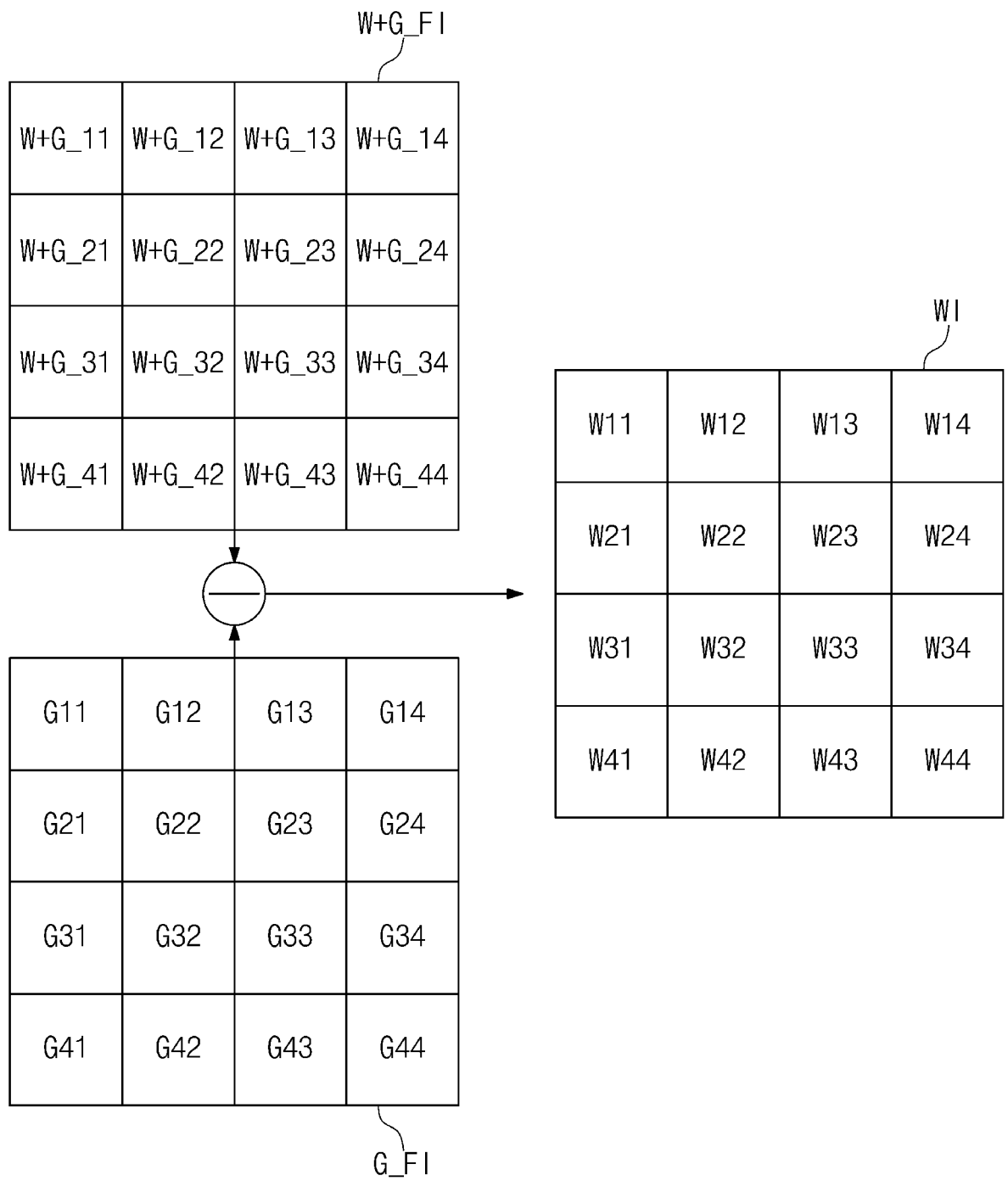
Figure 11C:
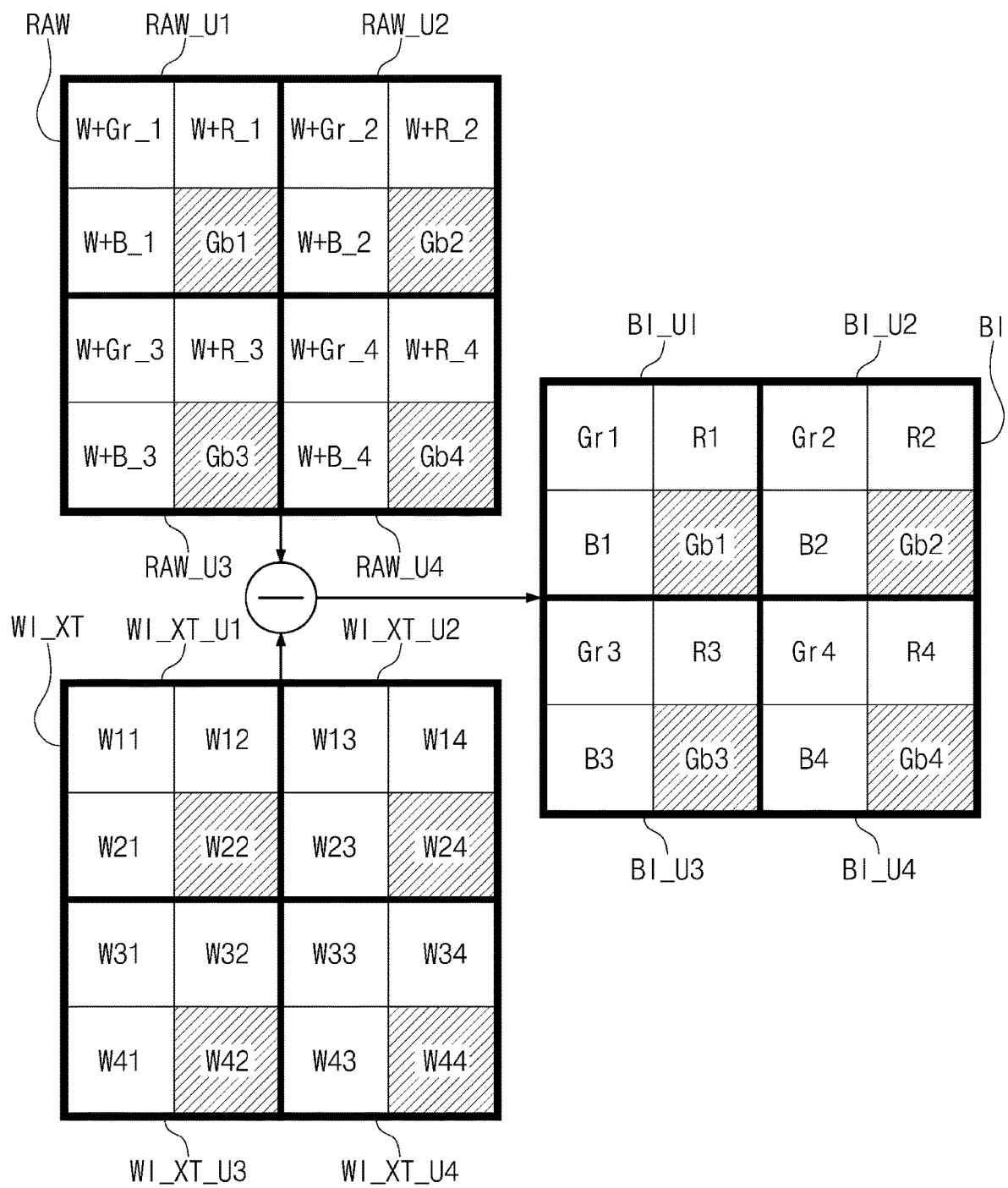

FIG. 10 is a block diagram illustrating a guided filtering module of FIG. 9 in more detail. FIGS. 11A to 11C are diagrams for describing a method of converting a raw image into a Bayer image. Referring to FIGS. 3, 9, and 10, the guided filtering module 150 may include a sampling module 151 and a full generation module 152.

In an embodiment, the sampling module 151 may receive the raw image RAW. The sampling module 151 may generate a white-green sampling image W+G_SI and a green sampling image G_SI based on the raw image RAW. For example, the white-green sampling image W+G_SI may have the fifth-type array pattern, and the green sampling image G_SI may have the sixth-type array pattern.

In FIG. 11A, additional description associated with the raw image RAW described above will be omitted to avoid redundancy. For example, the white-green sampling image W+G_SI may include 4 pixels arranged in 2 rows and 2 columns (i.e., 2×2). A size of the white-green sampling image W+G_SI may be ¼ of a size of the raw image RAW. The white-green sampling image W+G_SI may include only white-green color pixels W+Gr_1 to W+Gr_4 among pixels of the raw image RAW.

For example, the green sampling image G_SI may include 4 pixels arranged in 2 rows and 2 columns (i.e., 2×2). A size of the green sampling image G_SI may be ¼ of the size of the raw image RAW. The green sampling image G_SI may include only green color pixels Gb1 to Gb4 among the pixels of the raw image RAW.

In an embodiment, the full generation module 152 may receive the panchromatic image PI, the white-green sampling image W+G_SI, and the green sampling image G_SI. The full generation module 152 may generate the white-green full image W+G_FI based on the panchromatic image PI and the white-green sampling image W+G_SI. The full generation module 152 may generate the green full image G_FI based on the panchromatic image PI and the green sampling image G_SI. The full generation module 152 may output the white-green full image W+G_FI and the green full image G_FI.

In an embodiment, the white-green full image W+G_FI may include 16 pixels W+G_11 to W+G_44 arranged in 4 rows and 4 columns (i.e., 4×4). A size of the white-green full image W+G_FI may be equal to the size of the raw image RAW. For example, a code level of a first part W+G_11, W+G_12, W+G_21, and W+G_22 of the white-green full image W+G_FI may be equal to a code level of the first pixel W+Gr_1 of the white-green sampling image W+G_SI. A code level of a second part W+G_13, W+G_14, W+G_23, and W+G_24 of the white-green full image W+G_FI may be equal to a code level of the second pixel W+Gr_2 of the white-green sampling image W+G_SI. A code level of a third part W+G_31, W+G_32, W+G_41, and W+G_42 of the white-green full image W+G_FI may be equal to a code level of the third pixel W+Gr_3 of the white-green sampling image W+G_SI. A code level of a fourth part W+G_33, W+G_34, W+G_43, and W+G_44 of the white-green full image W+G_FI may be equal to a code level of the fourth pixel W+Gr_4 of the white-green sampling image W+G_SI.

The green full image G_FI may include 16 pixels G11 to G44 arranged in 4 rows and 4 columns (i.e., 4×4). A size of the green full image G_FI may be equal to the size of the raw image RAW. For example, a code level of a first part G11, G12, G21, and G22 of the green full image G_FI may be equal to a code level of the first pixel Gb1 of the green sampling image G_SI. A code level of a second part G13, G14, G23, and G24 of the green full image G_FI may be equal to a code level of the second pixel Gb2 of the green sampling image G_SI. A code level of a third part G31, G32, G41, and G42 of the green full image G_FI may be equal to a code level of the third pixel Gb3 of the green sampling image G_SI. A code level of a fourth part G33, G34, G43, and G44 of the green full image G_FI may be equal to a code level of the fourth pixel Gb4 of the green sampling image G_SI.

Referring to FIG. 11B, the white generation module 160 may generate the white image WI based on the white-green full image W+G_FI and the green full image G_FI. For example, the white generation module 160 may generate the white image WI by subtracting the green full image G_FI from the white-green full image W+G_FI. In other words, a code level of a pixel W11 of the white image WI may be calculated by subtracting a code level of a corresponding pixel G11 of the green full image G_FI from a code level of a corresponding pixel W+G_11 of the white-green full image W+G_FI. The white image WI may include 16 pixels W11 to W44 arranged in 4 rows and 4 columns (i.e., 4×4). A size of the white image WI may be equal to the size of the raw image RAW.

Referring to FIG. 11C, the Bayer extraction module 113 may generate the Bayer image BI based on the raw image RAW and the crosstalk-compensated white image WI_XT. For example, the Bayer image BI may include 16 pixels Gr1 to Gr4, R1 to R4, B1 to B4, and Gb1 to Gb4 arranged in 4 rows and 4 columns (i.e., 4×4). A size of the Bayer image BI may be equal to the size of the raw image RAW.

In an embodiment, the Bayer extraction module 113 may generate the Bayer image BI by subtracting the crosstalk-compensated white image WI_XT from the raw image RAW. Each of the raw image RAW, the crosstalk-compensated white image WI_XT, and the Bayer image BI may be divided into 4 basic units.

The Bayer extraction module 113 may generate a first basic unit BI_U1 of a Bayer image by performing the subtraction operation on the a first basic unit RAW_U1 of a raw image and a first basic unit WI_XT_U1 of a crosstalk-compensated white image, may generate a second basic unit BI_U2 of a Bayer image by performing subtraction operation on a second basic unit RAW_U2 of the raw image and a second basic unit WI_XT_U2 of the crosstalk-compensated white image, may generate a third basic unit BI_U3 of the Bayer image by performing the subtraction operation on a third basic unit RAW_U3 of the raw image and a third basic unit WI_XT_U3 of the crosstalk-compensated white image, and may generate a fourth basic unit BI_U4 of the Bayer image by performing the subtraction operation on a fourth basic unit RAW_U4 of the raw image and a fourth basic unit WI_XT_U4 of the crosstalk-compensated white image.

For example, in the first basic unit BI_U1, the Bayer extraction module 113 may generate a code level of the green color pixel Gr1 at the first row and first column of the Bayer image BI by subtracting the white pixel W11 at the first row and first column of the crosstalk-compensated white image WI_XT from the white-green color pixel W+Gr_1 at the first row and first column of the raw image RAW. The Bayer extraction module 113 may generate a code level of the red color pixel R1 at the first row and second column of the Bayer image BI by subtracting the white pixel W12 at the first row and second column of the crosstalk-compensated white image WI_XT from the white-red color pixel W+R_1 at the first row and second column of the raw image RAW. The Bayer extraction module 113 may generate a code level of the blue color pixel B1 at the second row and first column of the Bayer image BI by subtracting the white pixel W21 at the second row and first column of the crosstalk-compensated white image WI_XT from the white-blue color pixel W+B_1 at the second row and first column of the raw image RAW.

The Bayer extraction module 113 may not perform the subtraction operation on elements at the second row and second column. That is, a code level of the green color pixel Gb1 at the second row and second column of the Bayer image BI may be equal to a code level of the green color pixel Gb1 at the second row and second column of the raw image RAW. Code levels of pixels of the remaining basic units BI_U2 to BI_U4 are determined to be similar to those described above, and thus, additional description will be omitted to avoid redundancy.

For convenience of description, a first part of the raw image RAW may be classified as pixels W+Gr_1 to W+Gr_4, W+R_1 to W+R_4, and W+B_1 to W+B_4 associated with a white pixel, and a second part of the raw image RAW may be classified as pixels Gb1 to Gb4 not associated with a white pixel. That is, the first part of the raw image RAW may correspond to the first to third pixel groups PG1 to PG3 of the pixel set PS, on which the first sum operation is performed, and the second part of the raw image RAW may correspond to the fourth pixel group PG4 of the pixel set PS, on which the second sum operation is performed.

A first part of the crosstalk-compensated white image WI_XT may correspond to the first part of the raw image RAW, and a second part of the crosstalk-compensated white image WI_XT may correspond to the second part of the raw image RAW. A first part of the Bayer image BI may correspond to the first part of the raw image RAW, and a second part of the Bayer image BI may correspond to the second part of the raw image RAW. In FIG. 11C, shaded pixels may correspond to the second parts of the raw image RAW, the crosstalk-compensated white image WI_XT, and the Bayer image BI, and the remaining pixels may correspond to the first parts thereof.

As described above, the Bayer extraction module 113 may generate the first part of the Bayer image BI by performing the subtraction operation on the first part of the raw image RAW and the first part of the crosstalk-compensated white image WI_XT. The Bayer extraction module 113 may generate the second part of the Bayer image BI based on the second part of the raw image RAW.

Figure 12A:
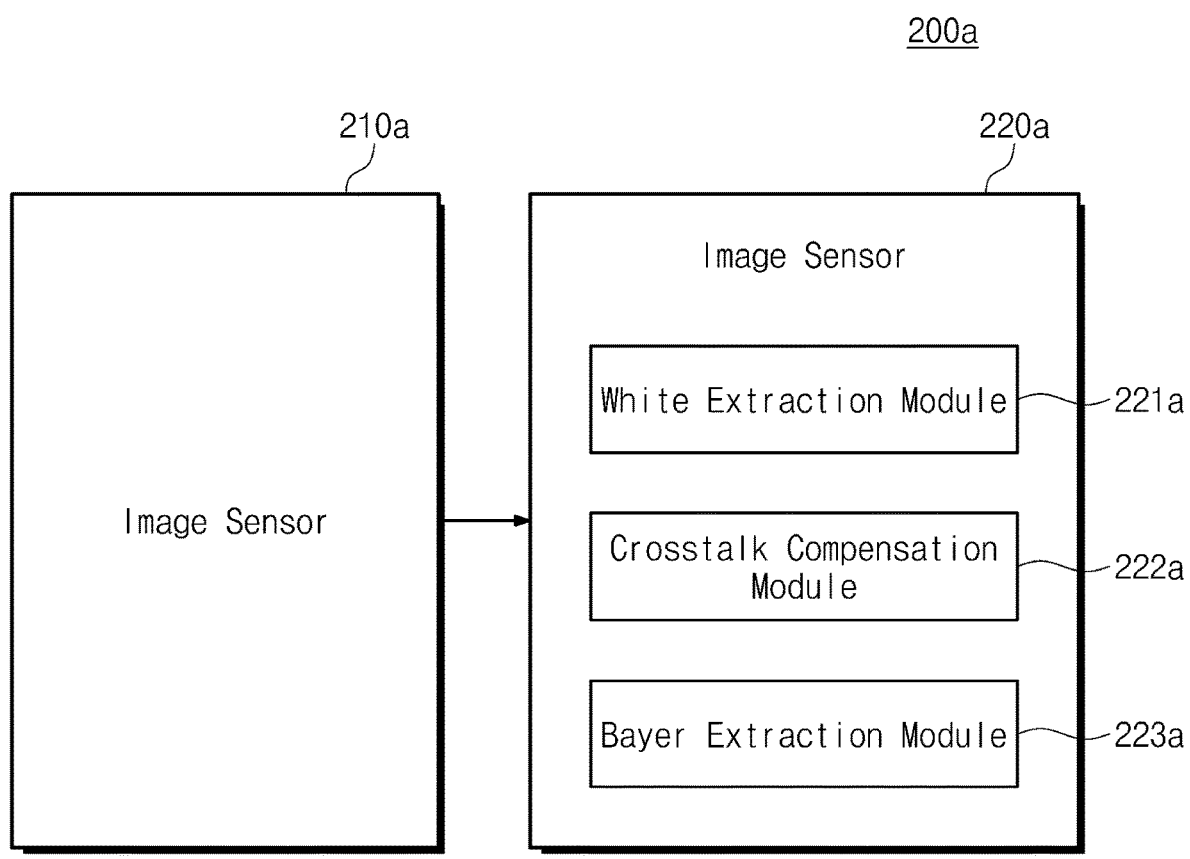
FIGS. 12A to 12C are block diagrams illustrating examples of an image device according to an embodiment.
Figure 12B:
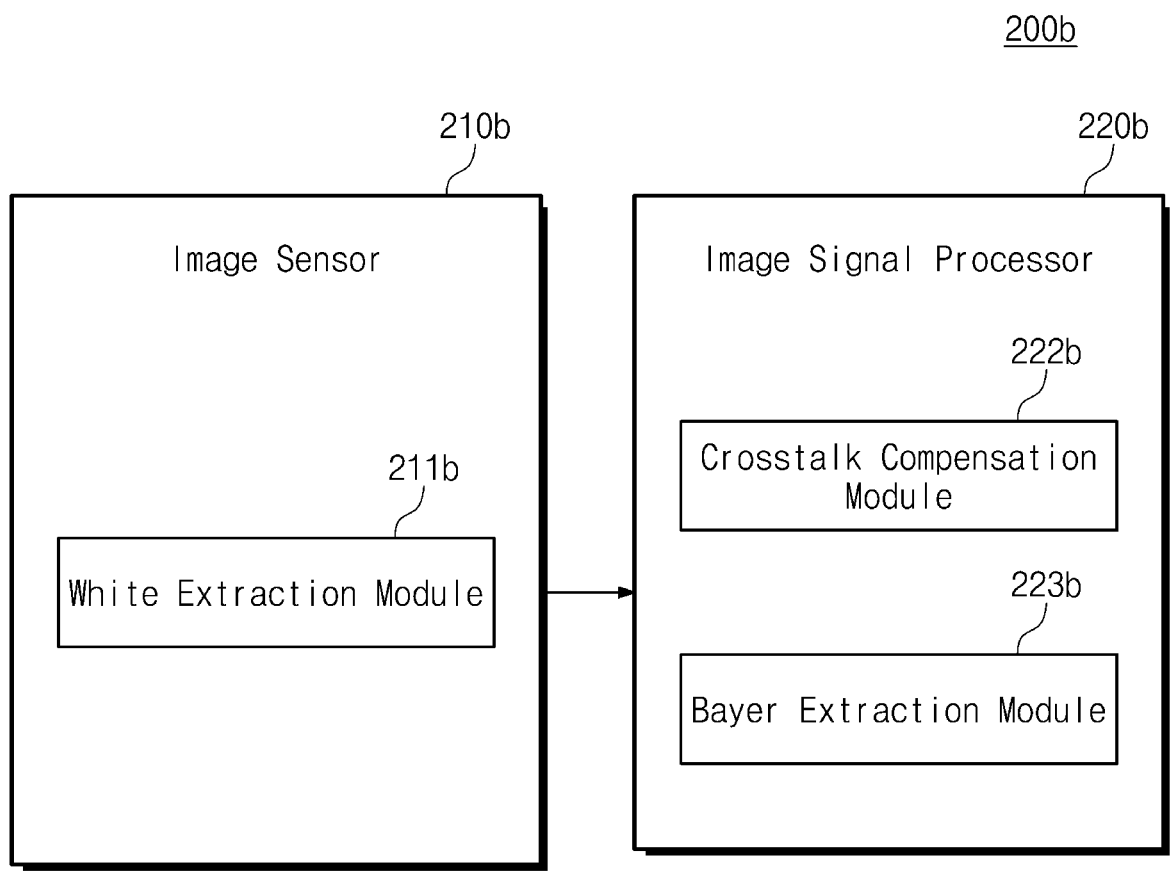
Figure 12C:
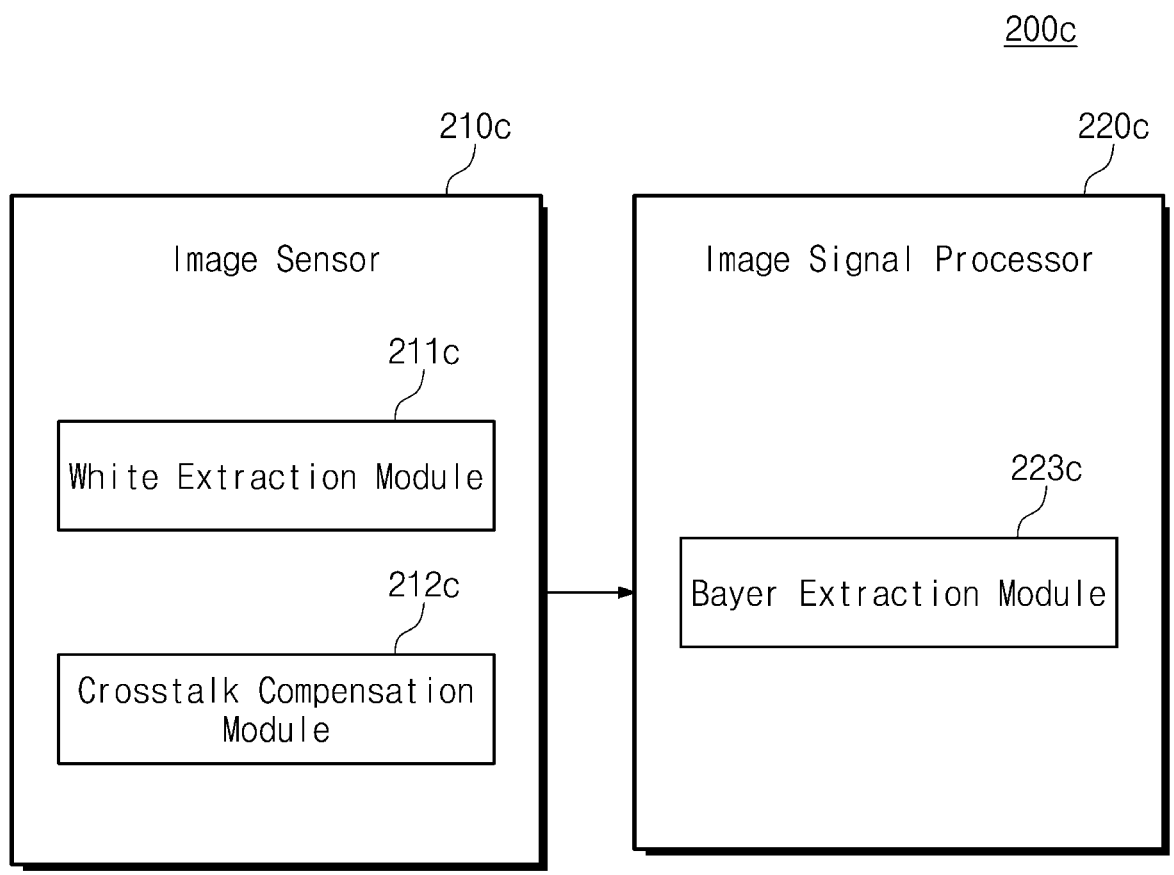

FIGS. 12A to 12C are block diagrams illustrating examples of an image device according to an embodiment of the present disclosure. Referring to FIG. 12A, an image device 200a may include an image sensor 210a and an image signal processor 220a. Unlike the image sensor 110 described above, the image sensor 210a may be configured to output a raw image. That is, the image sensor 210a may not include a white extraction module, a crosstalk compensation mode, and a Bayer extraction module.

Unlike the image signal processor 120 described above, the image signal processor 220a may be configured to receive the raw image RAW. That is, the image signal processor 220a of FIG. 12A may include a white extraction module 221a, a crosstalk compensation mode 222a, and a Bayer extraction module 223a. As in the scheme described with reference to FIGS. 1 to 11, the white extraction module 221a may perform the white extraction operation, the crosstalk compensation mode 222a may perform the crosstalk compensation operation, and the Bayer extraction module 223a may generate a Bayer image.

Referring to FIG. 12B, an image device 200b may include an image sensor 210b and an image signal processor 220b. Unlike the image sensor 110 described above, the image sensor 210b may be configured to output the raw image RAW and the white image WI. That is, the image sensor 210b may include a white extraction module 211b and may not include a crosstalk compensation mode and a Bayer extraction module. As in the scheme described with reference to FIGS. 1 to 11, the white extraction module 211b may perform the white extraction operation.

Unlike the image signal processor 120 described above, the image signal processor 220b may be configured to receive the raw image RAW and the white image WI. That is, the image signal processor 220b of FIG. 12B may include a crosstalk compensation mode 222b and a Bayer extraction module 223b. As in the scheme described with reference to FIGS. 1 to 11, the crosstalk compensation mode 222b may perform the crosstalk compensation operation, and the Bayer extraction module 223b may generate a Bayer image.

Referring to FIG. 12C, an image device 200c may include an image sensor 210c and an image signal processor 220c. Unlike the image sensor 110 described above, the image sensor 210c may be configured to output the raw image RAW and the crosstalk-compensated white image WI_XT. That is, the image sensor 210c may include a white extraction module 211c and a crosstalk compensation mode 212c and may not include a Bayer extraction module. As in the scheme described with reference to FIGS. 1 to 11, the white extraction module 211c may perform the white extraction operation, and the crosstalk compensation mode 212c may perform the crosstalk compensation operation.

Unlike the image signal processor 120 described above, the image signal processor 220c may be configured to receive the raw image RAW and the crosstalk-compensated white image WI_XT. That is, the image signal processor 220c of FIG. 12C may include a Bayer extraction module 223c. As in the scheme described with reference to FIGS. 1 to 11, the Bayer extraction module 223c may perform the Bayer image BI.

Figure 13:
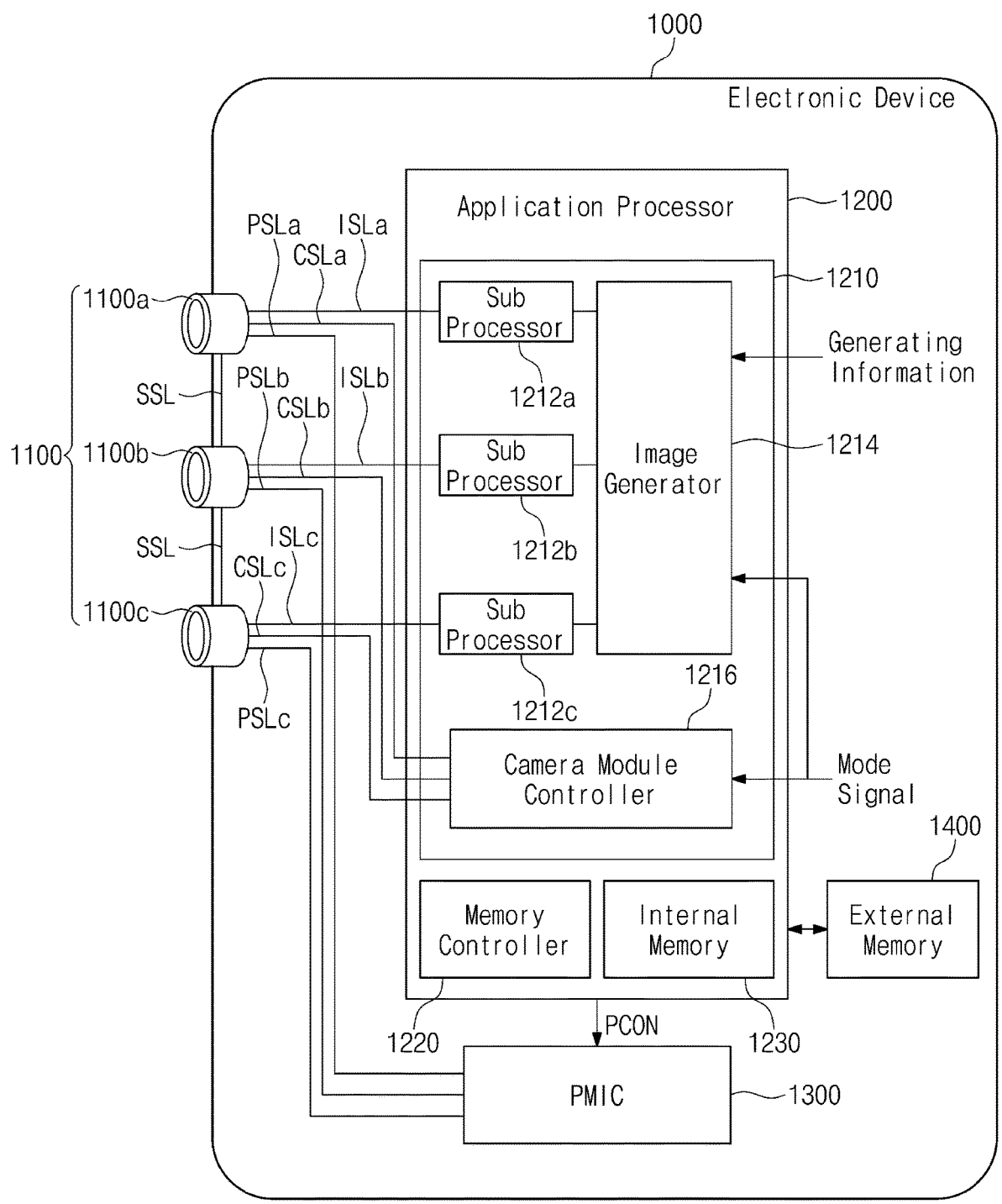
FIG. 13 is a block diagram illustrating a configuration of an electronic device including a multi-camera module according to an embodiment.
Figure 14:
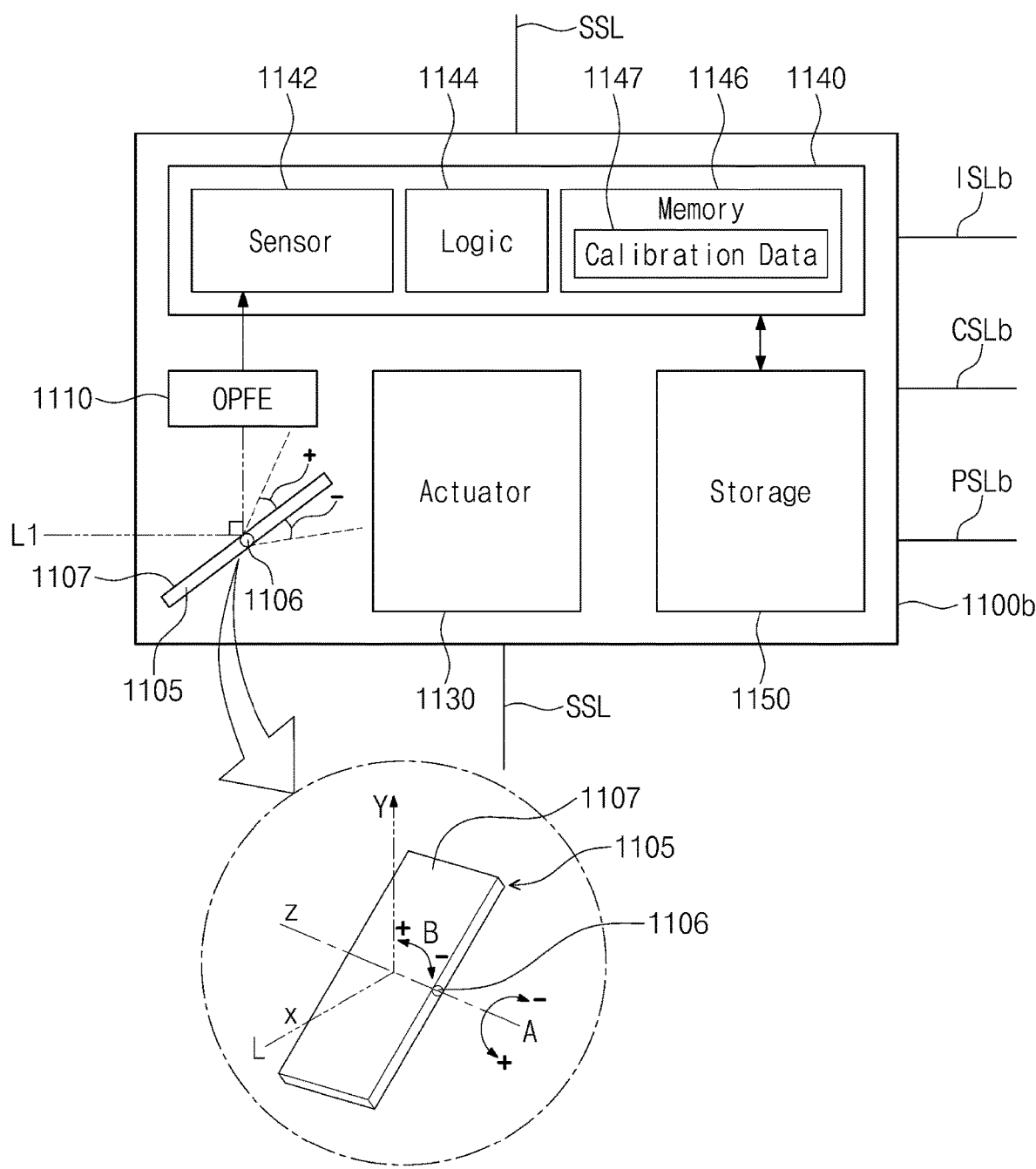
FIG. 14 is a detailed block diagram illustrating a configuration of a camera module of FIG. 13, according to an embodiment.

FIG. 13 is a block diagram illustrating a configuration of an electronic device including a multi-camera module according to an embodiment of the present disclosure. FIG. 14 is a detailed block diagram illustrating a configuration of a camera module of FIG. 13.

Referring to FIG. 13, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. An embodiment in which three camera modules 1100a, 1100b, and 1100c are disposed is illustrated in FIG. 13, but embodiments are not limited thereto. In some embodiments, the camera module group 1100 may be modified to include only two camera modules. Also, in some embodiments, the camera module group 1100 may be modified to include "n" camera modules, where n may be a natural number of 4 or more.

Below, an example of a detailed configuration of the camera module 1100b will be more fully described with reference to FIG. 14, but the following description may be equally applied to the remaining camera modules 1100a and 1100c.

Referring to FIG. 14, the camera module 1100b may include a prism 1105, an optical path folding element (OPFE) 1110, an actuator 1130, an image sensing device 1140, and a storage unit 1150.

The prism 1105 may include a reflecting plane 1107 of a light reflecting material and may change a path of a light "L" incident from the outside.

In some embodiments, the prism 1105 may change a path of the light "L" incident in a first direction "X" to a second direction "Y" perpendicular to the first direction "X". Also, the prism 1105 may change the path of the light "L" incident in the first direction "X" to the second direction "Y" perpendicular to the first direction "X" by rotating the reflecting plane 1107 of the light reflecting material in direction "A" about a central axis 1106 or rotating the central axis 1106 in direction "B". In this case, the OPFE 1110 may move in a third direction "Z" perpendicular to the first direction "X" and the second direction "Y".

In some embodiments, as illustrated, a maximum rotation angle of the prism 1105 in direction "A" may be equal to or smaller than 15 degrees in a positive A direction and may be greater than 15 degrees in a negative A direction, but embodiments are not limited thereto.

In some embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In some embodiments, the prism 1105 may move the reflecting plane 1107 of the light reflecting material in the third direction (e.g., a Z direction) parallel to a direction in which the central axis 1106 extends.

The OPFE 1110 may include optical lenses composed of "m" groups (m being a natural number), for example. Here, "m" lens may move in the second direction "Y" to change an optical zoom ratio of the camera module 1100b. For example, when a default optical zoom ratio of the camera module 1100b is "Z", the optical zoom ratio of the camera module 1100b may be changed to an optical zoom ratio of 3Z, 5Z, or 5Z or more by moving "m" optical lens included in the OPFE 1110. The OPFE 1110 may further include an optical lens (e.g., an anamorphic lens) composed of "n" groups (n being a natural number) in front of the "m" lens described above.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light "L" provided through an optical lens. The control logic 1144 may control overall operations of the camera module 1100b. For example, the control logic 1144 may control an operation of the camera module 1100b based on a control signal provided through a control signal line CSLb. In addition, the image sensor 1142 and the control logic 1144 may be configured to convert a non-Bayer image into a Bayer image through FIGS. 1 to 12C.

The memory 1146 may store information, which is necessary for an operation of the camera module 1100b, such as calibration data 1147. The calibration data 1147 may include information necessary for the camera module 1100b to generate image data by using the light "L" provided from the outside. The calibration data 1147 may include, for example, information about the degree of rotation described above, information about a focal length, information about an optical axis, etc. In the case where the camera module 1100b is implemented in the form of a multi-state camera in which a focal length varies depending on a location of an optical lens, the calibration data 1147 may include a focal length value for each location (or state) of the optical lens and information about auto focusing. The calibration data 1147 may include data necessary for the white balance operation, the crosstalk compensation operation, etc. described with reference to FIGS. 1 to 11C.

The storage unit 1150 may store image data sensed through the image sensor 1142. The storage unit 1150 may be disposed outside the image sensing device 1140 and may be implemented in a shape where the storage unit 1150 and a sensor chip included in the image sensing device 1140 are stacked. In some embodiments, the storage unit 1150 may be implemented with an electrically erasable programmable read only memory (EEPROM), but embodiments are not limited thereto.

Referring to FIGS. 13 and 14 together, in some embodiments, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 therein.

In some embodiments, one camera module (e.g., 1100b) among the plurality of camera modules 1100a, 1100b, and 1100c may be a folded lens shape of camera module in which the prism 1105 and the OPFE 1110 described above are included, and the remaining camera modules (e.g., 1100a and 1100c) may be a vertical shape of camera module in which the prism 1105 and the OPFE 1110 described above are not included; however, embodiments are not limited thereto.

In some embodiments, one camera module (e.g., 1100c) among the plurality of camera modules 1100a, 1100b, and 1100c may be, for example, a vertical shape of depth camera extracting depth information by using an infrared ray (IR). In this case, the application processor 1200 may merge image data provided from the depth camera and image data provided from any other camera module (e.g., 1100a or 1100b) and may generate a three-dimensional (3D) depth image.

In some embodiments, at least two camera modules (e.g., 1100a and 1100b) among the plurality of camera modules 1100a, 1100b, and 1100c may have different fields of view. In this case, the at least two camera modules (e.g., 1100a and 1100b) among the plurality of camera modules 1100a, 1100b, and 1100c may include different optical lenses, but embodiments are not limited thereto.

Also, in some embodiments, fields of view of the plurality of camera modules 1100a, 1100b, and 1100c may be different. In this case, the plurality of camera modules 1100a, 1100b, and 1100c may include different optical lenses, but embodiments are not limited thereto.

In some embodiments, the plurality of camera modules 1100a, 1100b, and 1100c may be disposed to be physically separated from each other. That is, the plurality of camera modules 1100a, 1100b, and 1100c may not use a sensing area of one image sensor 1142, but the plurality of camera modules 1100a, 1100b, and 1100c may include independent image sensors 1142 therein, respectively.

Returning to FIG. 13, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented with separate semiconductor chips. In some embodiments, the application processor 1200 may convert a raw image into a Bayer image as described with reference to FIGS. 1 to 11C.

The image processing device 1210 may include a plurality of sub image processors 1212a, 1212b, and 1212c, an image generator 1214, and a camera module controller 1216.

The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but embodiments are not limited thereto.

Meanwhile, in some embodiments, one sub image processor may be disposed to correspond to a plurality of camera modules. For example, the sub image processor 1212a and the sub image processor 1212c may be integrally implemented, not separated from each other as illustrated in FIG. 13; in this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information (illustrated as "Generating Information") or a mode signal (illustrated as "Mode Signal").

In detail, the image generator 1214 may generate the output image by merging at least a portion of the image data respectively generated from the camera modules 1100a, 1100b, and 1100c having different fields of view, depending on the image generating information or the mode signal. Also, the image generator 1214 may generate the output image by selecting one of the image data respectively generated from the camera modules 1100a, 1100b, and 1100c having different fields of view, depending on the image generating information or the mode signal.

In some embodiments, the image generating information may include a zoom signal or a zoom factor. Also, in some embodiments, the mode signal may be, for example, a signal based on a mode selected from a user.

In the case where the image generating information is the zoom signal or zoom factor and the camera modules 1100a, 1100b, and 1100c have different visual fields or fields of view, the image generator 1214 may perform different operations depending on a kind of the zoom signal. For example, in the case where the zoom signal is a first signal, the image generator 1214 may merge the image data output from the camera module 1100a and the image data output from the camera module 1100c and may generate the output image by using the merged image signal and the image data output from the camera module 1100b that is not used in the merging operation. In the case where the zoom signal is a second signal different from the first signal, without the image data merging operation, the image generator 1214 may select one of the image data respectively output from the camera modules 1100a, 1100b, and 1100c and may output the selected image data as the output image. However, embodiments are not limited thereto, and a way to process image data may be modified without limitation if necessary.

In some embodiments, the image generator 1214 may generate merged image data having an increased dynamic range by receiving a plurality of pieces of image data of different exposure times from at least one of the plurality of sub image processors 1212a, 1212b, and 1212c and performing high dynamic range (HDR) processing on the plurality pieces of image data. Also, in some embodiments, the image generator 1214 may generate an image having a reduced color difference with a final image generated in the first mode by performing a compensation operation on the second image.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) depending on the image generating information including a zoom signal or the mode signal, and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In some embodiments, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some embodiments, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one among sub image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may adjust a level of the power. The power control signal PCON may include a power adjustment signal for each operating mode of the plurality of camera modules 1100a, 1100b, and 1100c. For example, the operating mode may include a low-power mode. In this case, the power control signal PCON may include information about a camera module operating in the low-power mode and a set power level. Levels of the powers respectively provided to the plurality of camera modules 1100a, 1100b, and 1100c may be identical to each other or may be different from each other. Also, a level of a power may be dynamically changed.

According to the present disclosure, an image sensor may generate an image of a non-Bayer pattern through a single readout operation and may convert the image of, or having, the non-Bayer pattern into an image of, or having, a Bayer pattern. Accordingly, the overall performance of the image sensor may be improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image sensor comprising:
a pixel array including a plurality of pixels;
a row driver configured to control the plurality of pixels; and
an analog-to-digital converter configured to digitize a result sensed by the pixel array to generate a first image,
wherein the pixel array includes:
  first pixel groups, wherein each first pixel group of the first pixel groups includes first white pixels and first color pixels among the plurality of pixels; and
  second pixel groups, wherein each second pixel group of the second pixel groups includes second white pixels and second color pixels among the plurality of pixels,
wherein first pixel data are generated based on the first white pixels and the first color pixels,
wherein second pixel data are generated based on the second color pixels, and are not generated based on the first white pixels or the second white pixels, and
wherein the first image is generated based on the first pixel data and the second pixel data, and is not generated based on the second white pixels.

2. The image sensor of claim 1, wherein the row driver is configured to:
activate a first transfer signal connected with the first white pixels and a second transfer signal connected with the first color pixels such that the first pixel data of the first image are generated based on the first white pixels and the first color pixels; and
while a third transfer signal connected with the second white pixels is deactivated, activate a fourth transfer signal connected with the second color pixels such that the second pixel data of the first image are generated based on the second color pixels.

3. The image sensor of claim 1, wherein the first pixel groups include:
a green color pixel group including a first set of the first white pixels and green color pixels from among the first color pixels;
a red color pixel group including a second set of the first white pixels and red color pixels from among the first color pixels; and
a blue color pixel group including a third set of the first white pixels and blue color pixels from among the first color pixels.

4. The image sensor of claim 3, wherein the first set of the first white pixels and the green color pixels share a first floating diffusion region,
wherein the second set of the first white pixels and the red color pixels share a second floating diffusion region,
wherein the third set of the first white pixels and the blue color pixels share a third floating diffusion region, and
wherein the second white pixels and the second color pixels share a fourth floating diffusion region.

5. The image sensor of claim 3, wherein white-green pixel data of the first pixel data are generated based on the first set of the first white pixels and the green color pixels,
wherein white-red pixel data of the first pixel data are generated based on the second set of the first white pixels and the red color pixels, and
wherein white-blue pixel data of the first pixel data are generated based on the third set of the first white pixels and the blue color pixels.

6. The image sensor of claim 1, further comprising at least one processor configured to receive the first image and to generate a second image by performing a white extraction operation based on the first image.

7. The image sensor of claim 6, wherein the at least one processor is further configured to generate a third image by performing a crosstalk compensation operation based on the second image.

8. The image sensor of claim 7, wherein the at least one processor is further configured to:
load calibration data stored in advance; and
perform the crosstalk compensation operation in which a corresponding calibration value of the calibration data is multiplied with a code level of the second image to generate the third image.

9. The image sensor of claim 7, further wherein the at least one processor is further configured to generate an image having a Bayer pattern by performing a subtraction operation on the first image and the third image.

10. The image sensor of claim 9, wherein the subtraction operation is performed on the first pixel data of the first image and the third image and is not performed on the second pixel data of the first image and the third image.

11. The image sensor of claim 9, wherein the second pixel data of the first image are identical to corresponding pixel data of the image having the Bayer pattern.

12. The image sensor of claim 6, wherein the at least one processor is further configured to:
perform a white balance operation based on the first image such that a fourth image is generated;
perform a luma extraction operation on the fourth image such that a fifth image of an achromatic color is generated;
perform a guided filtering operation on the fifth image and the first image such that a sixth image of a white and green pattern and a seventh image of a green pattern are generated; and
perform a subtraction operation on the sixth image and the seventh image such that the second image is generated.

13. The image sensor of claim 12, wherein the at least one processor is further configured to:
adjust a gain for the first image; and perform the white balance operation based on the adjusted gain.

14. The image sensor of claim 12, wherein the first pixel groups include:
a green color pixel group including a first set of the first white pixels and first green color pixels from among the first color pixels,
wherein the second color pixels correspond to second green color pixels, and
wherein the at least one processor is further configured to:
generate a first sampling image including white-green pixel data of the first pixel data generated based on the green color pixel group and generate a second sampling image including the second pixel data; and
generate the sixth image, a size of which corresponds to a size of the first image, based on the first sampling image and generate the seventh image, a size of which corresponds to the size of the first image, based on the second sampling image.

15. An operation method of an image sensor which includes a first pixel group and a second pixel group, the method comprising:
performing a first sum operation on the first pixel group including a first white pixel and a first color pixel in a first readout process, wherein, in the first sum operation, a first signal is sampled and output based on the first white pixel and the first color pixel;
performing a second sum operation on the second pixel group including a second white pixel and a second color pixel in the first readout process, wherein, in the second sum operation, a second signal is sampled and output based on the second color pixel and not based on the second white pixel;
converting the first signal and the second signal into a digital signal to generate a raw image;
extracting a white image based on the raw image;
performing a crosstalk compensation operation based on the white image to generate a crosstalk-compensated white image; and
performing a subtraction operation on the raw image and the crosstalk-compensated white image to generate a Bayer image.

16. The method of claim 15, wherein the extracting of the white image based on the raw image includes:
performing a white balance operation based on the raw image to generate a white balanced raw image;
performing a luma extraction operation based on the white balanced raw image to generate a panchromatic image;
performing a guided filtering operation based on the panchromatic image and the raw image to generate a white-green full image and green full image; and
performing a subtraction operation on the white-green full image and the green full image to generate the white image.

17. The method of claim 16, wherein the performing of the guided filtering operation based on the panchromatic image and the raw image to generate the white-green full image and the green full image includes:
extracting a white-green sampling image based on the raw image;
extracting a green sampling image based on the raw image;
generating the white-green full image based on the panchromatic image and the white-green sampling image; and
generating the green full image based on the panchromatic image and the green sampling image.

18. The method of claim 17, wherein the performing of the first sum operation includes:
activating a first selection signal connected with a select transistor included in the first pixel group;
deactivating a first reset signal connected with a reset transistor included in the first pixel group;
activating a first transfer signal connected with the first white pixel and then deactivating the first transfer signal; and
activating a second transfer signal connected with the first color pixel and then deactivating the second transfer signal.

19. The method of claim 17, wherein the performing of the second sum operation:
activating a first selection signal connected with a select transistor included in the second pixel group;
deactivating a first reset signal connected with a reset transistor included in the second pixel group; and
while a third transfer signal connected with the second white pixel is deactivated, activating a fourth transfer signal connected with the second color pixel and then deactivating the fourth transfer signal.

20. An image device comprising:
an image sensor including a pixel set including a first pixel group, a second pixel group, a third pixel group, and a fourth pixel group; and
an image signal processor configured to perform a signal processing operation on image data received from the image sensor,
wherein the image sensor is configured to generate a raw image by:
performing a first sum operation on each of the first pixel group, the second pixel group, and the third pixel group such that first pixel data are generated based on all pixels sharing floating diffusion regions; and
performing a second sum operation on the fourth pixel group such that second pixel data are generated based on a part of pixels sharing a floating diffusion region; and
wherein the first pixel group includes first white pixels and first green color pixels,
wherein the second pixel group includes second white pixels and red color pixels,
wherein the third pixel group includes third white pixels and blue color pixels, and
wherein the fourth pixel group includes fourth white pixels and second green color pixels.

* * * * *